US012659797B2

(12) United States Patent
    Esswie

(10) Patent No.:    US 12,659,797 B2
(45) Date of Patent:    Jun. 16, 2026

(54) DYNAMIC PACKET RE-ORDERING, DISCARDING, AND FLOW SWITCHING

(71) Applicant: Dell Products, L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 599 days.

(21) Appl. No.: 18/183,617

(22) Filed: Mar. 14, 2023

(65) Prior Publication Data

US 2024/0314632 A1    Sep. 19, 2024

(51) Int. Cl.
    *H04W 28/06*        (2009.01)
    *H04L 47/34*        (2022.01)
(52) U.S. Cl.
    CPC ............. *H04W 28/06* (2013.01); *H04L 47/34* (2013.01)
(58) Field of Classification Search
    CPC ..... H04L 47/10; H04L 47/24; H04L 47/2416; H04L 47/245; H04L 47/27; H04L 47/28; H04L 47/32; H04L 47/323; H04L 47/34; H04L 1/1642; H04W 28/02; H04W 28/06
    See application file for complete search history.

(56) References Cited

U.S. PATENT DOCUMENTS 6,577,596 B1    6/2003    Olsson et al.
7,349,330 B1    3/2008    Hayakawa et al.

2004/0073692 A1    4/2004    Gentle et al.
2017/0187846 A1    6/2017    Shalev et al.
2019/0394675 A1    12/2019    Baek et al.
2021/0400537 A1    12/2021    Zhang et al.
    (Continued)

FOREIGN PATENT DOCUMENTS

EP        2 429 246        3/2012
WO        2022/075912        4/2022
    (Continued)

OTHER PUBLICATIONS

Machine Translation of WO 2024172525 A1 (Year: 2024).*
    (Continued)

*Primary Examiner* — Paul H. Masur
(74) *Attorney, Agent, or Firm* — Amin, Turocy & Watson, LLP

(57)            ABSTRACT

A radio access network node transmits a packet discard indication to configure a user equipment with indications that the node may discard packets corresponding to an indicated flow or corresponding to a flow received via an indicated resource. The packet discard indication configures the user equipment not to send a negative acknowledgement that a packet was not received via an indicated flow upon receiving an out-of-sequence packet corresponding to the indicated flow. The packet discard indication may configure the user equipment to decode a packet discarded from a flow indicated as being discarding-enabled via an indicated resource of an alternative target flow that may have a different quality-of-service, latency, or reliability than the flow to which the discarded packet belongs. The node may offload transmission of a packet discarded from a discarding-enabled flow to a flow indicated as an alternative target flow designated for offloading in the packet discard indication.

20 Claims, 22 Drawing Sheets

(56)  References Cited

U.S. PATENT DOCUMENTS

| | | | |
|---|---|---|---|
| 2023/0208776 A1 | 6/2023 | Furber et al. | |
| 2023/0283408 A1 | 9/2023 | Carrillo Marquez | |
| 2024/0064560 A1 | 2/2024 | Konda et al. | |
| 2024/0259869 A1* | 8/2024 | Ji | H04W 28/0289 |
| 2024/0275732 A1* | 8/2024 | He | H04L 47/32 |
| 2024/0284253 A1* | 8/2024 | Kuo | H04L 47/32 |
| 2025/0039740 A1* | 1/2025 | Fu | H04L 1/18 |

FOREIGN PATENT DOCUMENTS

| | | | | |
|---|---|---|---|---|
| WO | WO-2023184157 A1 * | 10/2023 | | H04L 47/32 |
| WO | WO-2024172525 A1 * | 8/2024 | | H04W 80/02 |
| WO | WO-2024173276 A1 * | 8/2024 | | H04L 1/1883 |
| WO | WO-2024173353 A1 * | 8/2024 | | H04L 1/188 |

OTHER PUBLICATIONS

Qualcomm, "Discussion on PDU discard", Feb. 27-Mar. 4, 2023, 3GPP TSG-RAN WG2 Meeting #121, R2-2300186, pp. 1-4 (Year: 2023).*

Qualcomm, "Discussion on protocol stack impacts by PDU Sets", Feb. 27-Mar. 4, 2023, 3GPP TSG-RAN WG2 Meeting #121, R2-2300187, pp. 1-4 (Year: 2023).*

Vivo, "Discussion on PDU discard for XR awareness", Feb. 27-Mar. 3, 2023, 3GPP TSG-RAN WG2 Meeting #121, R2-2300322, pp. 1-7 (Year: 2023).*

Intel, "Criteria and Mechanism of PDU Discard for XR traffic", Feb. 27-Mar. 3, 2023, 3GPP TSG RAN WG2 Meeting #121, R2-2300430 (Year: 2023).*

ZTE, "PDU discard for XR", Feb. 27-Mar. 3, 2023, 3GPP TSG-RAN2#121, R2-2300562, pp. 1-3 (Year: 2023).*

Notice of Allowance mailed May 21, 2025 for U.S. Appl. No. 18/183,606, 26 pages.

Esswie, Ali. "Dynamic Packet Re-Ordering, Discarding, and Flow Switching" U.S. Appl. No. 18/183,606, filed Mar. 14, 2023, 98 pages.

Technical specifications (TS) 38.201—"5G; NR; Physical layer; General description", 3GPP TS 38.201 version 15.0.0 Release 15, Sep. 2018, 14 pages.

Technical specifications (TS) 38.331—"5G; NR; Radio Resource Control (RRC); Protocol specification", 3GPP TS 38.331 version 16.1.0 Release 16, Jul. 2020, 886 pages.

Technical specifications (TS) 38.211—"5G; NR; Physical channels and modulation", 3GPP TS 38.211 version 16.2.0 Release 16, Jul. 2020, 136 pages.

Technical specifications (TS) 38.304—"5G; NR; User Equipment (UE) procedures in idle mode and in RRC Inactive state", 3GPP TS 38.304 version 16.1.0 Release 16, Jul. 2020, 41 pages.

Technical specifications (TS) 38.300—"5G; NR; NR and NG-RAN Overall description; Stage-2" 3GPP TS 38.300 version 16.4.0 Release 16, Jan. 2021, 151 pages.

International Search Report and Written Opinion mailed Feb. 6, 2024 for PCT Application No. PCT/US2023/035972, 18 pages.

Apple—Naveen Palle et al: "Views on Packet Discarding and Reordering", 3GPP Draft; R2-2300725; Type Discussion; FS_NR_XR_ENH, 3GPP RAN 2, No. Athens, GR; Feb. 17, 2023, [https://www.3gpp.org/ftp/TSG_RAN/WG2_R L2/TSGR2_121/Docs/R2-2300725.zip- R2-2300725 Views on Packet Discarding and Reordering. docx], 7 pages.

International Search Report and Written Opinion mailed Feb. 19, 2024 for PCT Application No. PCT/US2023/035973, 13 pages.

Notification Concerning Transmittal of International Preliminary Report on Patentability mailed Sep. 25, 2025 for PCT Application No. PCT/US2023/035972, 11 pages.

European Office Action mailed Oct. 21, 2025 for European Patent Application No. 23809827.1, 3 pages.

Notification Concerning Transmittal of International Preliminary Report on Patentability mailed Sep. 25, 2025 for PCT Application No. PCT/US2023/035973, 8 pages.

European Office Action mailed Oct. 21, 2025 for European Patent Application No. 23809828.9, 3 pages.

* cited by examiner

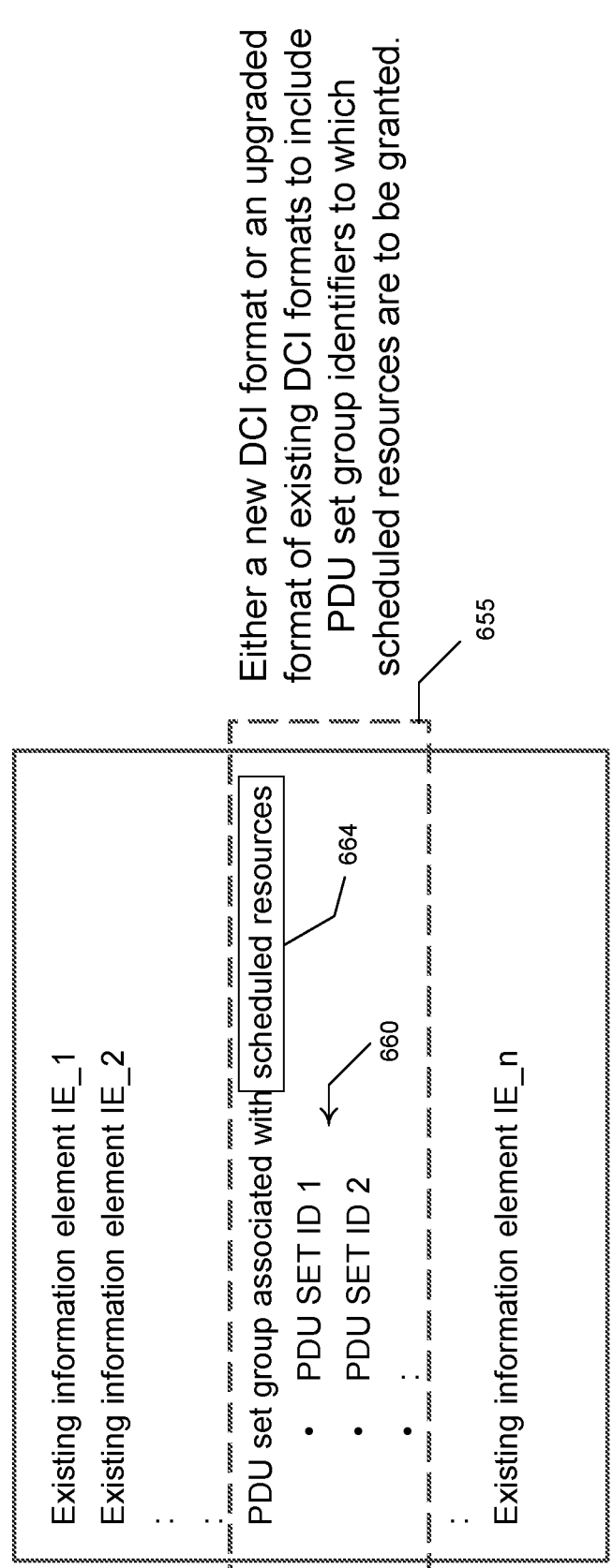

A new DCI format associated with a PDU set indication

Existing information element IE_1
Existing information element IE_2
.. ..

PDU set group associated with scheduled resources — 664

- PDU SET ID 1
- PDU SET ID 2
- ..
.

660

Either a new DCI format or an upgraded format of existing DCI formats to include PDU set group identifiers to which scheduled resources are to be granted.

655

..
Existing information element IE_n

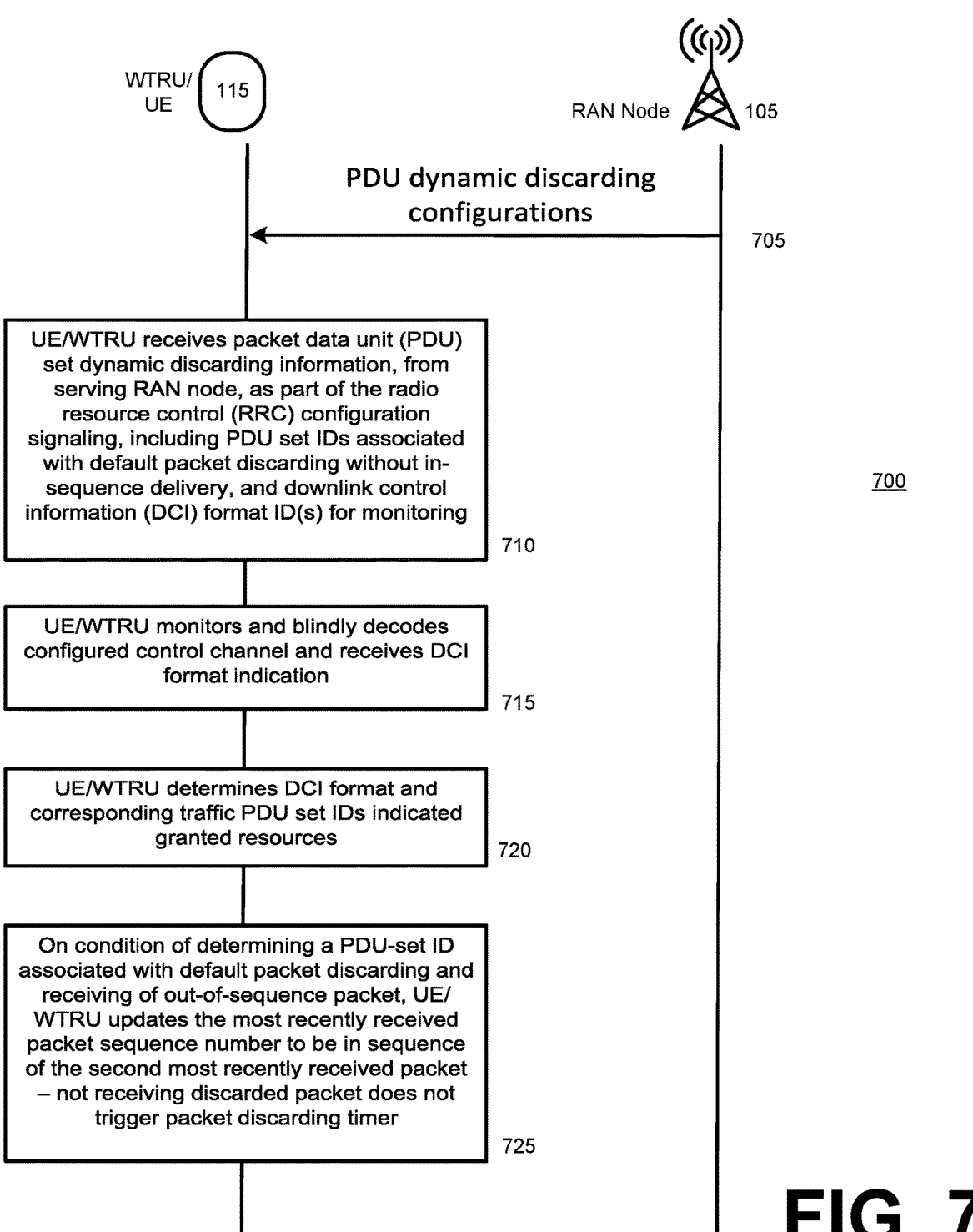

WTRU/ UE 115

RAN Node 105

700

PDU dynamic discarding configurations

705

UE/WTRU receives packet data unit (PDU) set dynamic discarding information, from serving RAN node, as part of the radio resource control (RRC) configuration signaling, including PDU set IDs associated with default packet discarding without in-sequence delivery, and downlink control information (DCI) format ID(s) for monitoring

710

UE/WTRU monitors and blindly decodes configured control channel and receives DCI format indication

715

UE/WTRU determines DCI format and corresponding traffic PDU set IDs indicated granted resources

720

On condition of determining a PDU-set ID associated with default packet discarding and receiving of out-of-sequence packet, UE/ WTRU updates the most recently received packet sequence number to be in sequence of the second most recently received packet – not receiving discarded packet does not trigger packet discarding timer

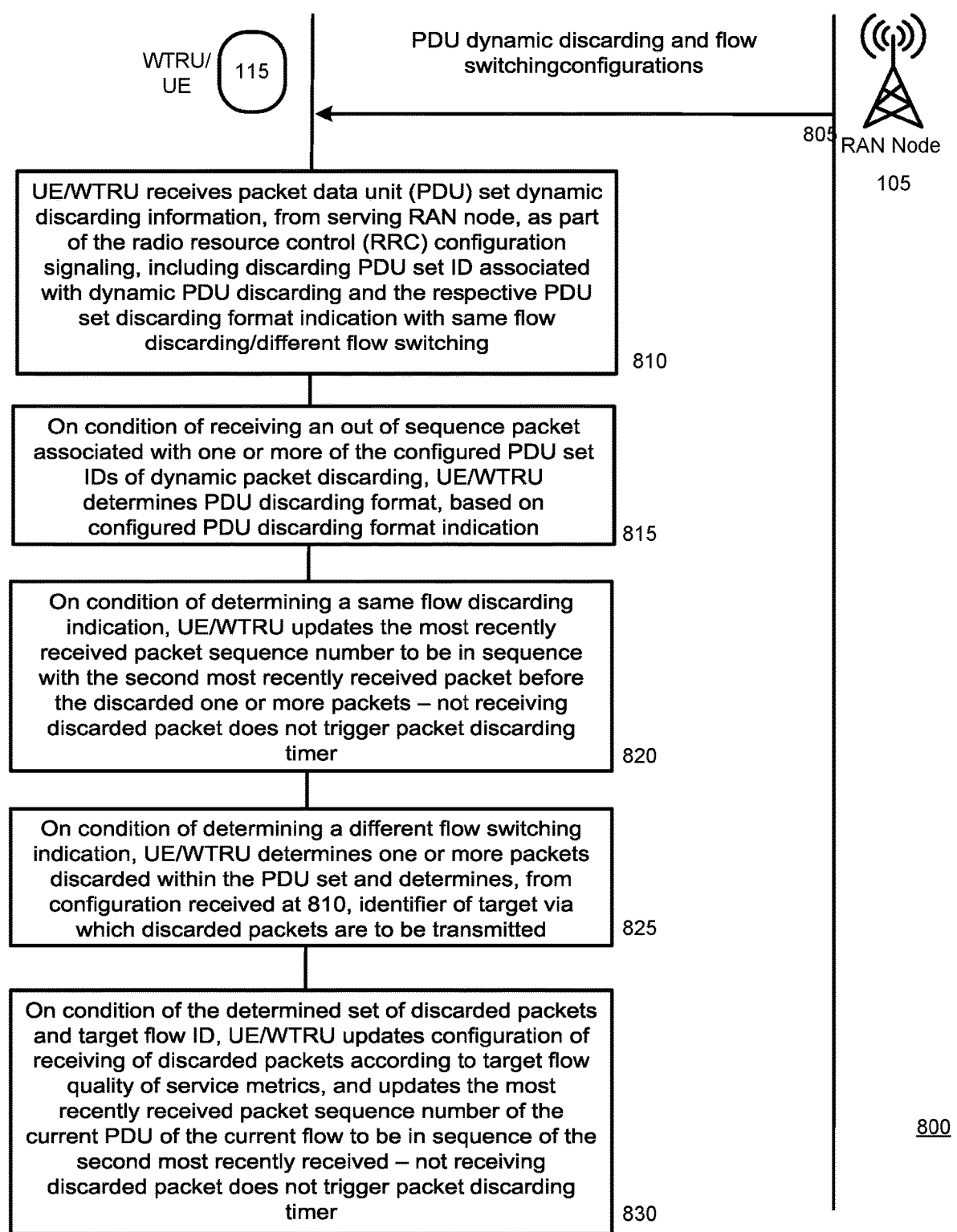

WTRU/
UE  115

PDU dynamic discarding and flow
switchingconfigurations

805 RAN Node
105

UE/WTRU receives packet data unit (PDU) set dynamic
discarding information, from serving RAN node, as part
of the radio resource control (RRC) configuration
signaling, including discarding PDU set ID associated
with dynamic PDU discarding and the respective PDU
set discarding format indication with same flow
discarding/different flow switching                    810

On condition of receiving an out of sequence packet
associated with one or more of the configured PDU set
IDs of dynamic packet discarding, UE/WTRU
determines PDU discarding format, based on
configured PDU discarding format indication        815

On condition of determining a same flow discarding
indication, UE/WTRU updates the most recently
received packet sequence number to be in sequence
with the second most recently received packet before
the discarded one or more packets – not receiving
discarded packet does not trigger packet discarding
timer                                              820

On condition of determining a different flow switching
indication, UE/WTRU determines one or more packets
discarded within the PDU set and determines, from
configuration received at 810, identifier of target via
which discarded packets are to be transmitted      825

On condition of the determined set of discarded packets
and target flow ID, UE/WTRU updates configuration of
receiving of discarded packets according to target flow
quality of service metrics, and updates the most
recently received packet sequence number of the
current PDU of the current flow to be in sequence of the
second most recently received – not receiving
discarded packet does not trigger packet discarding
timer                                              830

Figure 10:
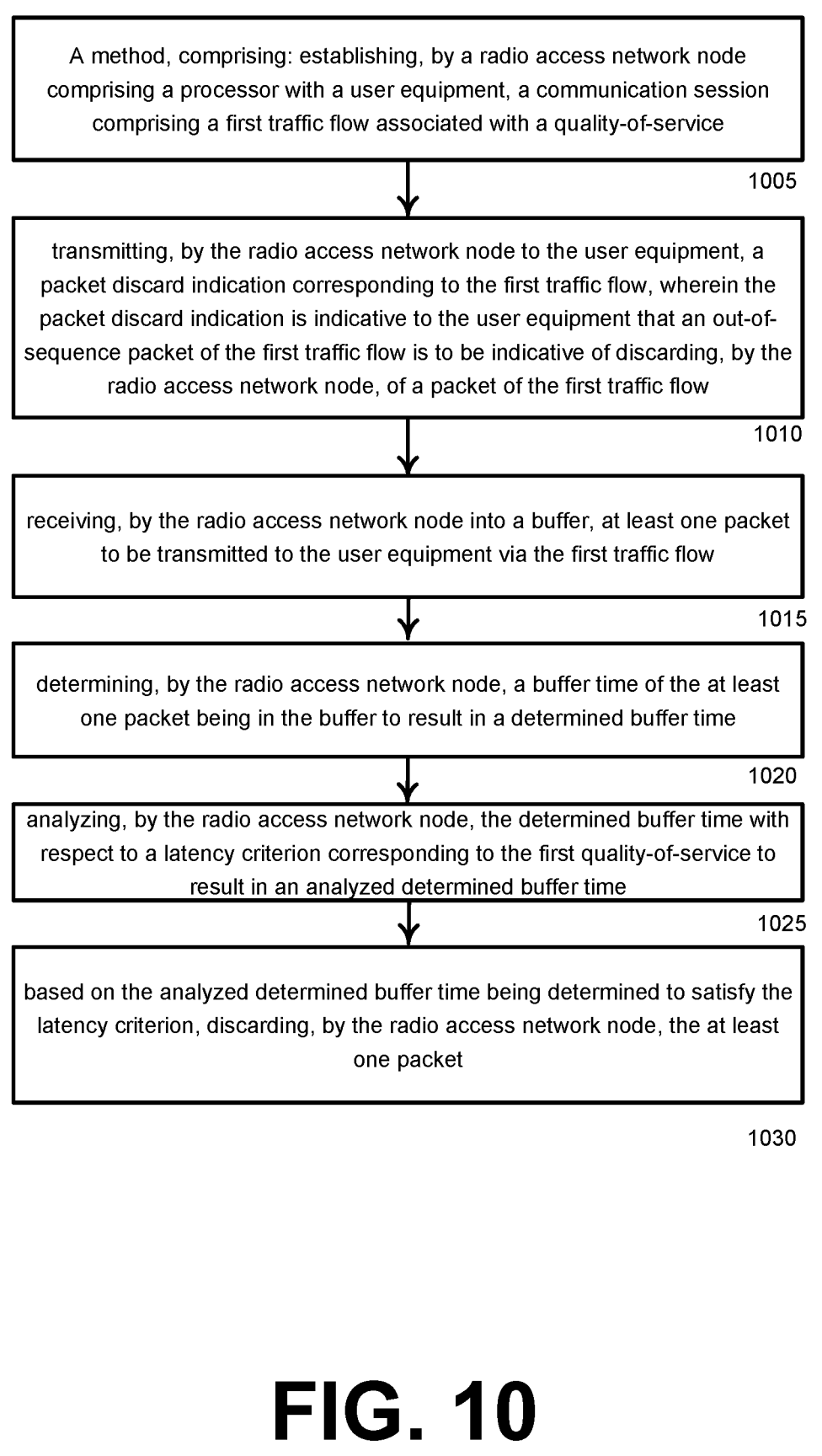

A method, comprising: establishing, by a radio access network node comprising a processor with a user equipment, a communication session comprising a first traffic flow associated with a quality-of-service

1005 transmitting, by the radio access network node to the user equipment, a packet discard indication corresponding to the first traffic flow, wherein the packet discard indication is indicative to the user equipment that an out-of-sequence packet of the first traffic flow is to be indicative of discarding, by the radio access network node, of a packet of the first traffic flow

1010 receiving, by the radio access network node into a buffer, at least one packet to be transmitted to the user equipment via the first traffic flow

1015 determining, by the radio access network node, a buffer time of the at least one packet being in the buffer to result in a determined buffer time

1020 analyzing, by the radio access network node, the determined buffer time with respect to a latency criterion corresponding to the first quality-of-service to result in an analyzed determined buffer time

1025 based on the analyzed determined buffer time being determined to satisfy the latency criterion, discarding, by the radio access network node, the at least one packet

Figure 11:
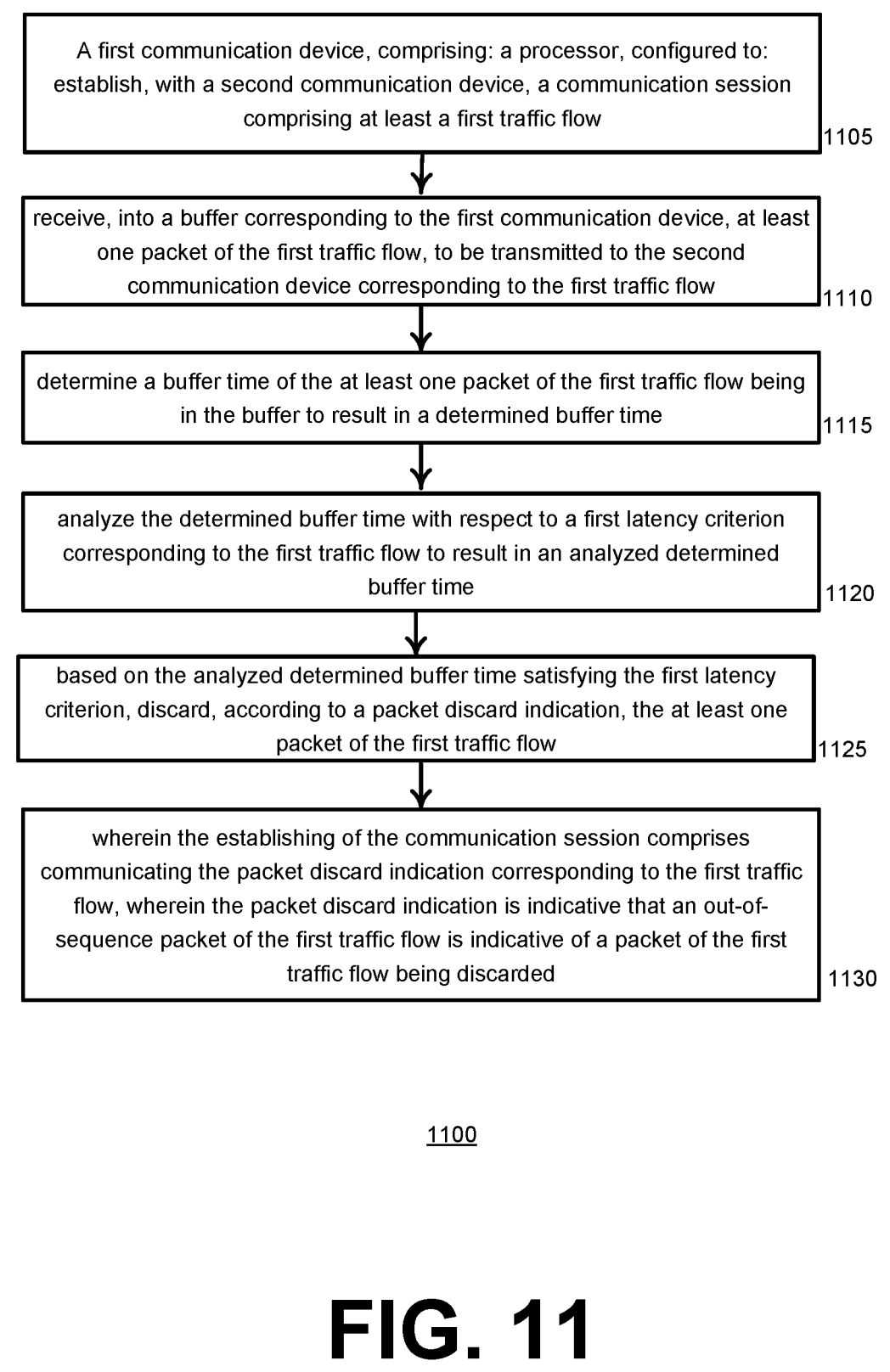

A first communication device, comprising: a processor, configured to: establish, with a second communication device, a communication session comprising at least a first traffic flow

1105 receive, into a buffer corresponding to the first communication device, at least one packet of the first traffic flow, to be transmitted to the second communication device corresponding to the first traffic flow

1110 determine a buffer time of the at least one packet of the first traffic flow being in the buffer to result in a determined buffer time

1115 analyze the determined buffer time with respect to a first latency criterion corresponding to the first traffic flow to result in an analyzed determined buffer time

1120 based on the analyzed determined buffer time satisfying the first latency criterion, discard, according to a packet discard indication, the at least one packet of the first traffic flow

1125 wherein the establishing of the communication session comprises communicating the packet discard indication corresponding to the first traffic flow, wherein the packet discard indication is indicative that an out-of-sequence packet of the first traffic flow is indicative of a packet of the first traffic flow being discarded

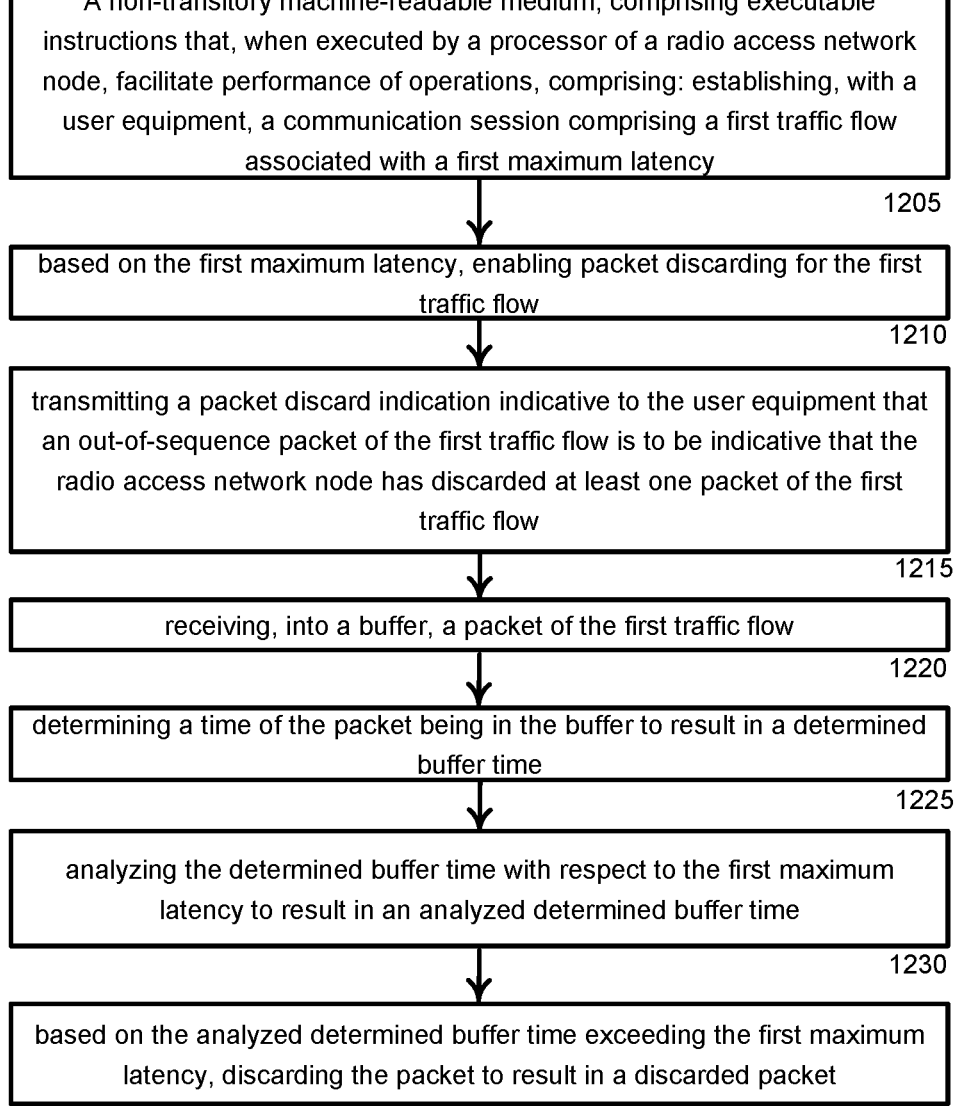

A non-transitory machine-readable medium, comprising executable instructions that, when executed by a processor of a radio access network node, facilitate performance of operations, comprising: establishing, with a user equipment, a communication session comprising a first traffic flow associated with a first maximum latency

1205 based on the first maximum latency, enabling packet discarding for the first traffic flow

1210 transmitting a packet discard indication indicative to the user equipment that an out-of-sequence packet of the first traffic flow is to be indicative that the radio access network node has discarded at least one packet of the first traffic flow

1215 receiving, into a buffer, a packet of the first traffic flow

1220 determining a time of the packet being in the buffer to result in a determined buffer time

1225 analyzing the determined buffer time with respect to the first maximum latency to result in an analyzed determined buffer time

1230 based on the analyzed determined buffer time exceeding the first maximum latency, discarding the packet to result in a discarded packet

Figure 13:
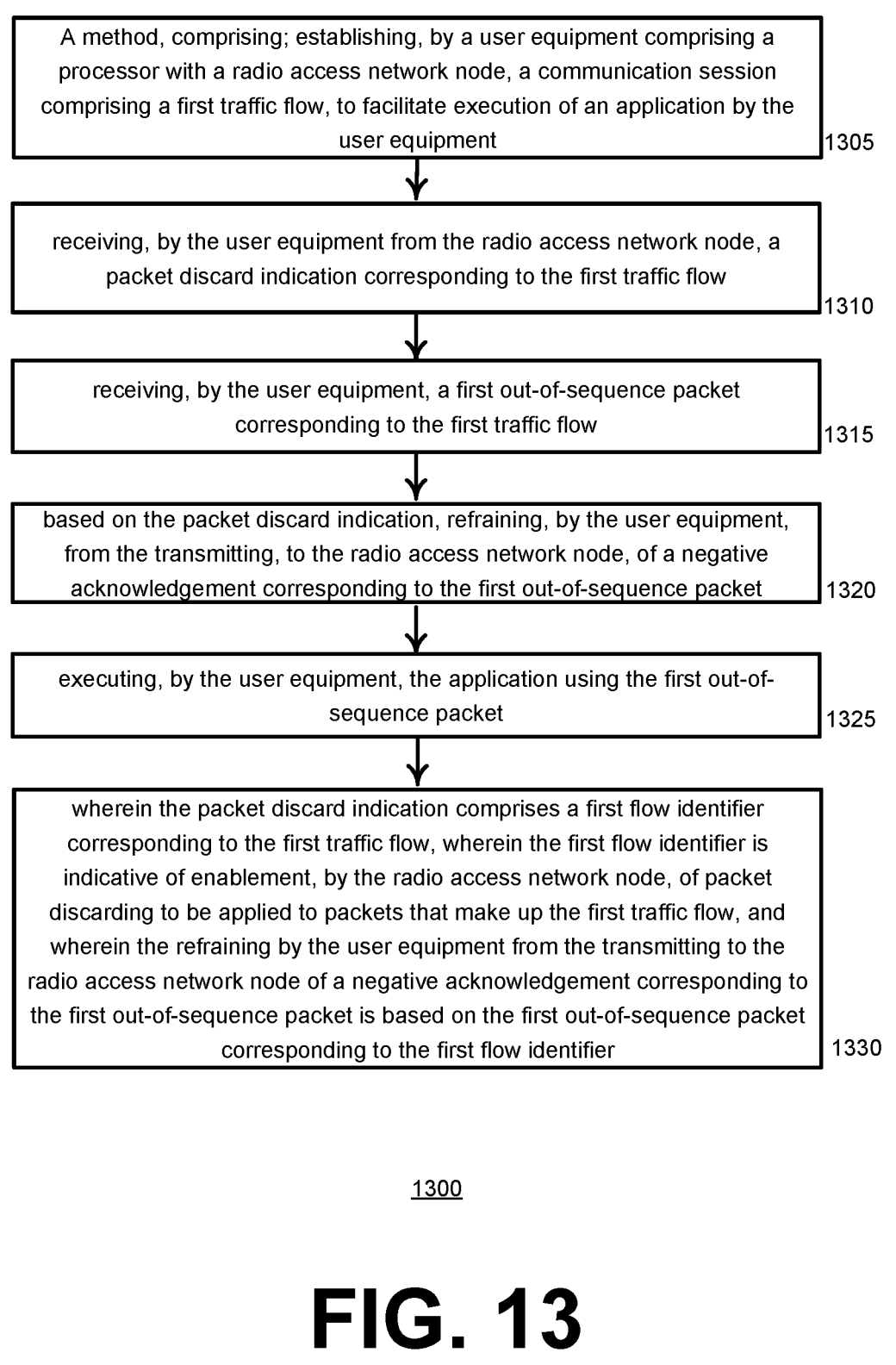

A method, comprising; establishing, by a user equipment comprising a processor with a radio access network node, a communication session comprising a first traffic flow, to facilitate execution of an application by the user equipment 　1305

↓ receiving, by the user equipment from the radio access network node, a packet discard indication corresponding to the first traffic flow 　1310

↓ receiving, by the user equipment, a first out-of-sequence packet corresponding to the first traffic flow 　1315

↓ based on the packet discard indication, refraining, by the user equipment, from the transmitting, to the radio access network node, of a negative acknowledgement corresponding to the first out-of-sequence packet 　1320

↓ executing, by the user equipment, the application using the first out-of-sequence packet 　1325

↓ wherein the packet discard indication comprises a first flow identifier corresponding to the first traffic flow, wherein the first flow identifier is indicative of enablement, by the radio access network node, of packet discarding to be applied to packets that make up the first traffic flow, and wherein the refraining by the user equipment from the transmitting to the radio access network node of a negative acknowledgement corresponding to the first out-of-sequence packet is based on the first out-of-sequence packet corresponding to the first flow identifier 　1330

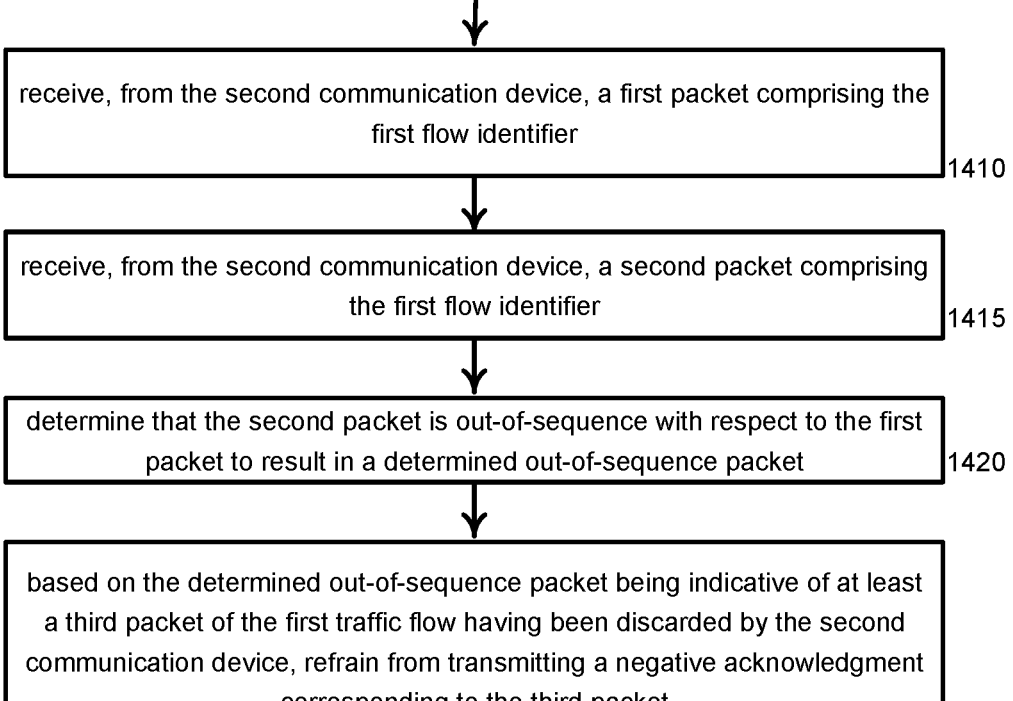

A first communication device, comprising: a processor, configured to: establish, with a second communication device, a communication session comprising at least a first traffic flow, wherein the establishing of the communication session comprises receiving a packet discard indication corresponding to the first traffic flow, wherein the packet discard indication comprises a first flow identifier corresponding to the first traffic flow, and wherein the packet discard indication is indicative that an out-of-sequence packet that comprises the first flow identifier is indicative of a packet of the first traffic flow having been discarded by the second communication device  1405 receive, from the second communication device, a first packet comprising the first flow identifier  1410 receive, from the second communication device, a second packet comprising the first flow identifier  1415 determine that the second packet is out-of-sequence with respect to the first packet to result in a determined out-of-sequence packet  1420 based on the determined out-of-sequence packet being indicative of at least a third packet of the first traffic flow having been discarded by the second communication device, refrain from transmitting a negative acknowledgment corresponding to the third packet  1425

Figure 15:
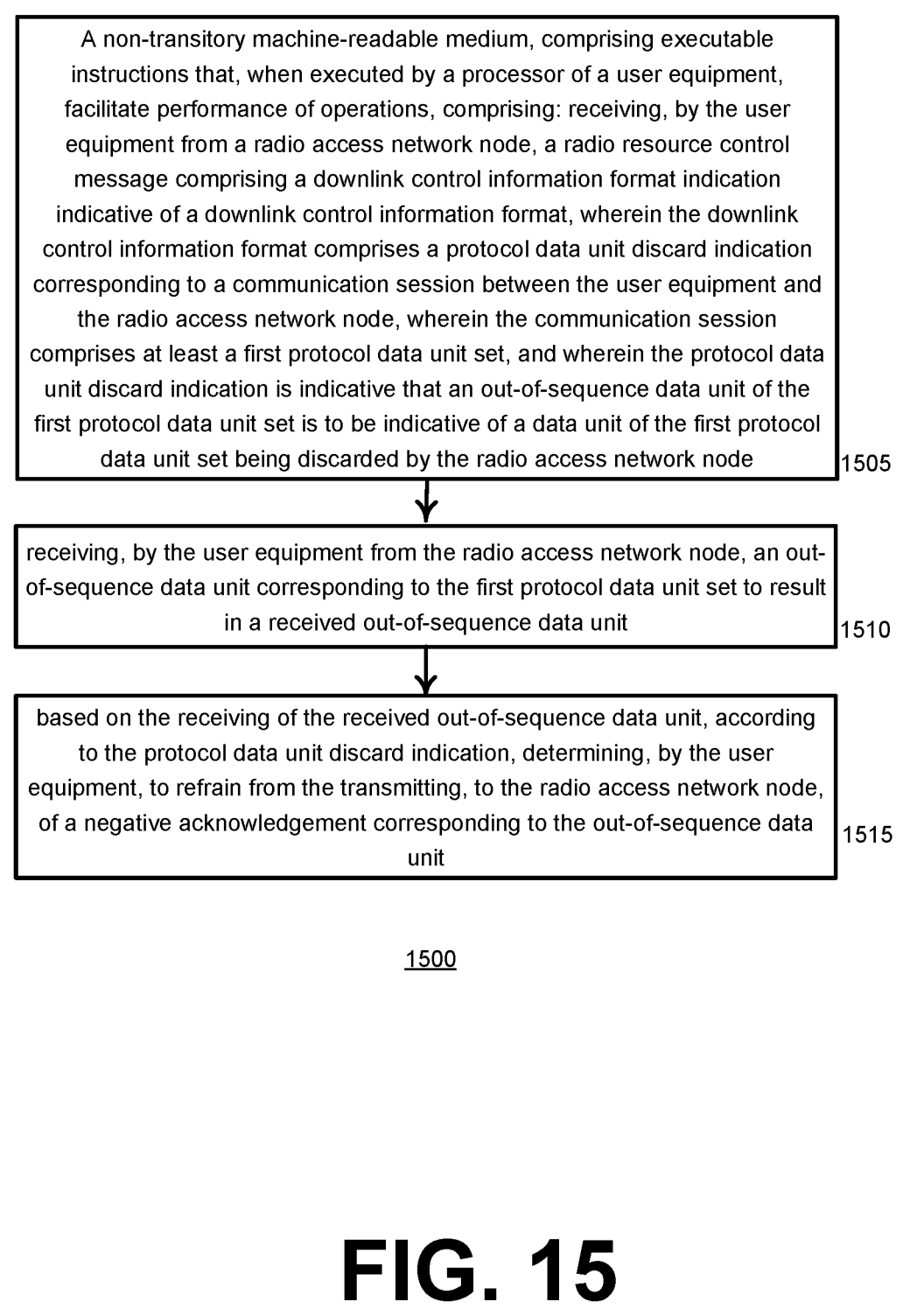

A non-transitory machine-readable medium, comprising executable instructions that, when executed by a processor of a user equipment, facilitate performance of operations, comprising: receiving, by the user equipment from a radio access network node, a radio resource control message comprising a downlink control information format indication indicative of a downlink control information format, wherein the downlink control information format comprises a protocol data unit discard indication corresponding to a communication session between the user equipment and the radio access network node, wherein the communication session comprises at least a first protocol data unit set, and wherein the protocol data unit discard indication is indicative that an out-of-sequence data unit of the first protocol data unit set is to be indicative of a data unit of the first protocol data unit set being discarded by the radio access network node | 1505 receiving, by the user equipment from the radio access network node, an out-of-sequence data unit corresponding to the first protocol data unit set to result in a received out-of-sequence data unit | 1510 based on the receiving of the received out-of-sequence data unit, according to the protocol data unit discard indication, determining, by the user equipment, to refrain from the transmitting, to the radio access network node, of a negative acknowledgement corresponding to the out-of-sequence data unit | 1515

DYNAMIC PACKET RE-ORDERING, DISCARDING, AND FLOW SWITCHING

BACKGROUND

The 'New Radio' (NR) terminology that is associated with fifth generation mobile wireless communication systems ("5G") refers to technical aspects used in wireless radio access networks ("RAN") that comprise several quality-of-service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, an example method may comprise establishing, by a radio access network node comprising a processor with a user equipment, a communication session comprising a first traffic flow associated with a quality-of-service and transmitting, by the radio access network node to the user equipment, a packet discard indication corresponding to the first traffic flow, wherein the packet discard indication is indicative to the user equipment that an out-of-sequence packet of the first traffic flow is to be indicative of discarding, by the radio access network node, of a packet of the first traffic flow. The method may further comprise receiving, by the radio access network node into a buffer, at least one packet to be transmitted to the user equipment via the first traffic flow, determining, by the radio access network node, a buffer time of the at least one packet being in the buffer to result in a determined buffer time, and analyzing, by the radio access network node, the determined buffer time with respect to a latency criterion corresponding to the first quality-of-service to result in an analyzed determined buffer time. Based on the analyzed determined buffer time being determined to satisfy the latency criterion, the method may further comprise discarding, by the radio access network node, the at least one packet.

The establishing of the communication session may comprise transmitting a radio resource control configuration message that comprises the packet discard indication and that associates the packet discard indication with a first traffic flow identifier corresponding to the first traffic flow. The packet discard indication may comprise an indication of a RRC format. The packet discard indication may comprise information to be used by the user equipment in conjunction with the RRC format to determine whether discarding is enabled. The establishing of the communication session comprises transmitting a radio resource control message that comprises the packet discard indication and that associates the packet discard indication with a protocol data unit set identifier corresponding to the first traffic flow. The establishing of the communication session comprises transmitting a radio resource control message that comprises the packet discard indication, and wherein the packet discard indication indicates association of the packet discard indication with a quality-of-class identifier corresponding to the quality-of-service.

In an embodiment, the establishing of the communication session may comprise transmitting a radio resource control flow message that comprises the packet discard indication, wherein the packet discard indication comprises an allocation of a resource to be used to transmit the first traffic flow from the radio access network node to the user equipment. The packet discard indication may comprise a flow resource indication indicative to the user equipment that packet discarding, by the radio access network node, is enabled for the first traffic flow transmitted by the radio access network node to the user equipment via the resource.

In an embodiment, the communication session may comprise a second traffic flow, wherein the establishing of the communication session comprises transmitting a radio resource control flow message, or other RRC message, that comprises the packet discard indication, and wherein the packet discard indication comprises a packet offload indication indicative to the user equipment that an out-of-sequence packet of the first traffic flow is to be transmitted by the radio access network node to the user equipment via a resource set allocated to the second traffic flow and with corresponding second flow transmission configurations. The first traffic flow is associated with a first priority, wherein the second traffic flow is associated with a second priority, and wherein the second priority is lower than the first priority. The first traffic flow corresponds to data directed to a center portion of a virtual reality appliance, and wherein the second traffic flow corresponds to data directed to a peripheral portion of the virtual reality appliance.

In an embodiment the establishing of the communication session may comprise transmitting a radio resource control flow message that comprises the packet discard indication, wherein the packet discard indication comprises an allocation of a first resource to be used to transmit the first traffic flow from the radio access network node to the user equipment. The packet discard indication may comprise a flow resource indication indicative to the user equipment that packet discarding, by the radio access network node, is enabled for the first traffic flow. The communication session may comprises a second traffic flow. The packet discard indication comprises an allocation of a second resource to be used to transmit the second traffic flow from the radio access network node to the user equipment. The packet discard indication may comprise a packet offload indication indicative to the user equipment that an out-of-sequence packet of the first traffic flow is to be transmitted by the radio access network node to the user equipment via the second resource. The packet discard indication may comprise, or the offload indication may comprise, an out-of-sequence packet indication indicative to the user equipment that an out-of-sequence packet of the first traffic flow is to be indicative to the user equipment that the radio access network node transmitted the out-of-sequence packet of the first traffic flow via the second resource corresponding to the second traffic flow.

In another example embodiment, a first communication device may comprise a processor that is configured to establish, with a second communication device, a communication session comprising at least a first traffic flow. The first communication device may be a radio access network node or a user equipment. The second communication device may be a radio access network node or a user equipment. The processor of the first communication device may be further configured to receive, into a buffer corresponding to the first communication device, at least one packet of the first traffic flow, to be transmitted to the second communication device corresponding to the first traffic flow. The buffer may comprise a scheduling buffer. The process of the first communication may be further configured to determine a buffer time of the at least one packet of the first traffic flow being in the buffer to result in a determined buffer time (e.g., an amount of time the at least one packet has been in the buffer), analyze the determined buffer time with respect to a first latency criterion corresponding to the first traffic flow to result in an analyzed determined buffer time, and based on the analyzed determined buffer time satisfying the first latency criterion, discard, according to a packet discard indication, the at least one packet of the first traffic flow. For example, if the packet corresponds to a flow that has a criterion that latency be very low, the processor of the first communication device may be configured to discard the packet and the second communication device may be configured, by a DCI format or a packet discard indication, not to transmit a negative acknowledgement when receiving an out-of-sequence packet if the discarded packet is not receive by the second communication device. Establishing of the communication session may comprise communicating the packet discard indication corresponding to the first traffic flow, wherein the packet discard indication is indicative that an out-of-sequence packet of the first traffic flow is indicative of a packet of the first traffic flow being discarded.

In an embodiment, a radio resource control flow message may comprise the packet discard indication and may associate the packet discard indication with a quality-of-class identifier corresponding to the first latency criterion. Thus, the second communication may be configured to determine, based on the packet discard indication, that an out-of-sequence packet corresponding to the quality-of-class identifier is indicative that a missing packet corresponding to the out-of-sequence packet has been discarded by the first communication device.

In another embodiment, the communication session may comprise a second traffic flow. The packet discard indication may comprise an allocation of a first resource to be used to transmit the first traffic flow. The packet discard indication may comprise an allocation of a second resource to be used to transmit the second traffic flow. A radio resource control format may comprise the packet discard indication. The packet discard indication may comprise a packet offload indication indicative to the second communication device that an out-of-sequence packet of the first traffic flow is to be transmitted by the first communication device to the second communication device via the second resource. The first traffic flow may be associated with a first priority, wherein the second traffic flow is associated with a second priority, and wherein the second priority is lower than the first priority. The processor of the first communication device may be further configured to transmit, to the second communication device via the second traffic flow, or a resource corresponding to the second flow, the packet discarded from the first traffic flow.

In another embodiment, an example non-transitory machine-readable medium comprising executable instructions that, when executed by a processor of a radio access network node, facilitate performance of operations, comprising establishing, with a user equipment, a communication session comprising a first traffic flow associated with a first maximum latency. Based on the first maximum latency, the operations may further comprise enabling packet discarding for the first traffic flow. For example, if an application executing on the user equipment needs has a strict latency budget, the radio access network node enable packet discarding for the first traffic flow. The operations may further comprise transmitting a packet discard indication indicative to the user equipment that an out-of-sequence packet of the first traffic flow is to be indicative that the radio access network node has discarded at least one packet of the first traffic flow. The operations may further comprise receiving, into a buffer, a packet of the first traffic flow, determining a time of the packet being in the buffer to result in a determined buffer time, analyzing the determined buffer time with respect to the first maximum latency to result in an analyzed determined buffer time. Based on the analyzed determined buffer time exceeding the first maximum latency, the operations may further comprise discarding the packet to result in a discarded packet.

In an embodiment, the communication session may comprise a second traffic flow, and the operations may further comprise transmitting, to the user equipment via the second traffic flow, the discarded packet.

In an embodiment, the communication session may comprise a second traffic flow. The packet discard indication may comprise a first resource indication that associates a first resource with the first traffic flow, a second resource indication that associates a second resource with the second traffic flow, and a resource selection indication indicative to the user equipment that an out-of-sequence packet of the first traffic flow is to be indicative to the user equipment that the discarded packet is to be transmitted by the radio access network node according to the second resource. The operations further comprise transmitting, to the user equipment via the second resource, the discarded packet.

In an embodiment, the first traffic flow may be associated with a first reliability, the second traffic flow may be associated with a second reliability, and the second reliability may be lower than the first reliability.

In an embodiment, the packet discard indication may comprise an acknowledgement refrain indication indicative to the user equipment to refrain from transmitting a negative-acknowledgement message to the radio access network node corresponding an out-of-sequence packet received from the radio access network node. For example, the acknowledgement refrain indication may indicate to the user equipment that an out-of-sequence packet corresponding to a flow indicated in the packet discard indication should not be followed up with a NACK, initiation of a wait timer to determine is a missing packet corresponding to the packet (e.g., the missing packet should have a lower sequence number than the received out-of-sequence packet).

In another example embodiment, an example method comprises establishing, by a user equipment comprising a processor with a radio access network node, a communication session comprising a first traffic flow, to facilitate execution of an application by the user equipment. The method may further comprise receiving, by the user equipment from the radio access network node, a packet discard indication corresponding to the first traffic flow. The receiving of the packet discard indication corresponding to the first traffic flow may be part of the establishing of the communication session, or may be facilitated by messaging separate from connection establishment with the radio access network node. The example method may further comprise receiving, by the user equipment, a first out-of-sequence packet corresponding to the first traffic flow. Based on the packet discard indication, the method may further comprise refraining, by the user equipment, from the transmitting, to the radio access network node, of a negative acknowledgement corresponding to the first out-of-sequence packet, and executing, by the user equipment, the application using the first out-of-sequence packet. Accordingly, based on the packet discard indication, the user equipment may be configured to recognize that the receiving of the first out-of-sequence packet is indicative that the radio access network node discarded one or more packets of the first traffic flow and thus the user equipment does not transmit a NACK and assumes that the radio access network node discarded one or more packets, having lower, or earlier, sequence number(s) than the first out-of-sequence packet, that may otherwise have been received by the user equipment.

In an embodiment, the communication may session comprise a second traffic flow, and the method may further comprise receiving, by the user equipment, a second out-of-sequence packet corresponding to the second traffic flow. The method may further comprise transmitting, by the user equipment to the radio access network node, a negative acknowledgement corresponding to the second out-of-sequence packet, receiving a missing packet corresponding to the second traffic flow based on the transmitting of the negative acknowledgment, and executing, by the user equipment, the application using the missing packet. In this scenario, the user equipment may not be configured to treat an out-of-sequence packet of the second traffic flow as being enabled for packet discard but the radio access network node. Thus, the user equipment may initiate a wait time, upon the wait timer expiring and the user equipment not having received a missing packet, the user equipment may transmit the NACK to request retransmission or one or more missing packets based on having received the second out-of-sequence packet.

In an embodiment, the packet discard indication may comprise a first flow identifier corresponding to the first traffic flow. The first flow identifier may be indicative of enablement, by the radio access network node, of packet discarding to be applied to packets that make up the first traffic flow. The refraining by the user equipment from the transmitting to the radio access network node of a negative acknowledgement corresponding to the first out-of-sequence packet may be based on the first out-of-sequence packet corresponding to the first flow identifier.

The example method may further comprise determining, by the user equipment, a latency corresponding to the first traffic flow, wherein the application corresponds to an application type, and wherein the latency is determined based on the application type. A latency criterion may correspond to the first traffic flow. The establishing of the communication session may comprise transmitting a radio resource control message indicative of the latency criterion and the packet discarding may be applied to one or more packets of the first traffic flow that are stored in a buffer of the radio access network node longer than the latency criterion.

In an embodiment of the example method, the packet discard indication may comprise a first flow identifier corresponding to the first traffic flow. The packet discard indication may comprise a first resource associated with the first flow identifier. The first flow identifier being associated with the first resource is indicative of enablement, by the radio access network node, of packet discarding to be applied to packets that make up the first traffic flow that are transmitted via the first resource. The refraining by the user equipment from the transmitting of a negative acknowledgement corresponding to the first out-of-sequence packet may be based on correspondence of the first out-of-sequence packet to the first flow identifier and based on the first out-of-sequence packet being received via the first resource.

In another embodiment of the example method, the packet discard indication may comprise a first flow identifier corresponding to the first traffic flow, wherein the packet discard indication comprises a first resource, or an indication of a first resource, associated with the first flow identifier. The communication session may comprise a second traffic flow and the packet discard indication may comprises a second flow identifier corresponding to the second traffic flow, wherein the packet discard indication comprises a second resource associated with the second flow identifier. Furthermore, the packet discard indication may comprise a packet offload indication indicative that an out-of-sequence packet of the first traffic flow is to be transmitted by the radio access network node to the user equipment via the second resource. The method may further comprise based on the packet offload indication, receiving, by the user equipment, a missing packet of the first traffic flow corresponding to the first out-of-sequence packet via the second resource and executing, by the user equipment, the application using the missing packet. The first traffic flow may be associated with a first priority, wherein the second traffic flow is associated with a second priority, and wherein the second priority is lower than the first priority. Thus, a packet of the first traffic flow may be offloaded to be received by the user equipment using a resource corresponding to the second traffic flow, which may have a lower priority than the first traffic flow. In an embodiment, the first traffic flow may correspond to data directed to a center portion of a virtual reality appliance and the second traffic flow corresponds to data directed to a peripheral portion of the virtual reality appliance (e.g., data directed to the peripheral portion may have a lower priority that data directed to the center portion). The application may be an anything reality application that manages a virtual reality appliance that is communicatively coupled with the user equipment.

In an embodiment, the establishing of the communication session may comprise receiving a radio resource control message that comprises the packet discard indication and the radio resource control message may associate the packet discard indication with a first traffic flow identifier corresponding to the first traffic flow.

In an embodiment, the establishing of the communication session may comprise receiving a radio resource control message that comprises the packet discard indication and that associates the packet discard indication with a protocol data unit set identifier corresponding to the first traffic flow.

In an embodiment, the establishing of the communication session may comprise receiving a radio resource control message that comprises the packet discard indication, and wherein the packet discard indication indicates association of the packet discard indication with a quality-of-class identifier corresponding to the first traffic flow.

In another example embodiment, a first communication device may comprise a processor, configured to establish, with a second communication device, a communication session comprising at least a first traffic flow. The establishing of the communication session may comprise receiving a packet discard indication corresponding to the first traffic flow, wherein the packet discard indication comprises a first flow identifier corresponding to the first traffic flow, and wherein the packet discard indication is indicative that an out-of-sequence packet that comprises the first flow identifier is indicative of a packet of the first traffic flow having been discarded by the second communication device. The processor of the first communication device may be further configured to receive, from the second communication device, a first packet comprising the first flow identifier and receive, from the second communication device, a second packet comprising the first flow identifier. The processor may be further configured to determine that the second packet is out-of-sequence with respect to the first packet to result in a determined out-of-sequence packet. Based on the determined out-of-sequence packet being indicative of at least a third packet of the first traffic flow having been discarded by the second communication device, the processor may be further configured to refrain from transmitting a negative acknowledgment corresponding to the third packet.

In an embodiment, the communication session may comprise a second traffic flow. The packet discard indication may comprise a first resource indication indicative of a first resource to be used to transmit the first traffic flow and the packet discard indication may comprise a second resource indication indicative of a second resource to be used to transmit the second traffic flow. The packet discard indication may comprise an offload indication indicative that a discarded packet of the first traffic flow may be transmitted by the second communication device via the second resource, and the processor may be further configured to, based on the offload indication, receive the third packet via the second resource. The first traffic flow may correspond to a first reliability, the second traffic flow may correspond to a second reliability, and the second reliability may be lower than the first reliability.

In yet another embodiment, an example non-transitory machine-readable medium, may comprise executable instructions that, when executed by a processor of a user equipment, facilitate performance of operations, comprising receiving, by the user equipment from a radio access network node, a radio resource control message comprising a downlink control information format indication indicative of a downlink control information format, wherein the downlink control information format comprises a protocol data unit discard indication corresponding to a communication session between the user equipment and the radio access network node. The communication session may comprise at least a first protocol data unit set, and the protocol data unit discard indication may be indicative that an out-of-sequence data unit of the first protocol data unit set is to be indicative of a data unit of the first protocol data unit set being discarded by the radio access network node. The operations may further comprise receiving, by the user equipment from the radio access network node, an out-of-sequence data unit corresponding to the first protocol data unit set to result in a received out-of-sequence data unit, and, based on the receiving of the received out-of-sequence data unit, according to the protocol data unit discard indication, determining, by the user equipment, to refrain from the transmitting, to the radio access network node, of a negative acknowledgement corresponding to the out-of-sequence data unit.

In an embodiment of the example non-transitory machine-readable medium, the protocol data unit discard indication may comprise a first protocol data unit set identifier corresponding to the first protocol data unit set. The received out-of-sequence data unit may comprise the first protocol data unit set identifier. The determining, by the user equipment to refrain from the transmitting, to the radio access network node, of a negative acknowledgement corresponding to the out-of-sequence data unit may be based on the received out-of-sequence data unit comprising, or containing, the first protocol data unit set identifier.

In another embodiment of the example non-transitory machine-readable medium, the downlink control information format may be indicative of a resource to be used by the radio access network node for transmission of the first protocol data unit set to the user equipment. The protocol data unit discard indication may comprise a first protocol data unit set identifier corresponding to the first protocol data unit set. The protocol data unit discard indication may be indicative that an out-of-sequence data unit, comprising the first protocol data unit set identifier, received via the resource is to be indicative of a data unit of the first protocol data unit set having been discarded by the radio access network node. The received out-of-sequence data unit may comprise the first protocol data unit set identifier and may be received via the resource. Accordingly, the user equipment may be configured to assume that a received out-of-sequence indicates that the corresponding data unit set may comprise missing packets based on the received out-of-sequence data unit being received via the resource indicated in the protocol data unit discard indication.

In another embodiment of the example non-transitory machine-readable medium, the communication session may comprise a second protocol data unit set. The downlink control information format may be indicative of a first resource to be used by the radio access network node for transmission of the first protocol data unit set to the user equipment. The downlink control information format may be indicative of a second resource to be used by the radio access network node for transmission of the second protocol data unit set to the user equipment. The protocol data unit discard indication may comprise a first protocol data unit set identifier corresponding to the first protocol data unit set. The protocol data unit discard indication may comprise a second protocol data unit set identifier corresponding to the second protocol data unit set. The protocol data unit discard indication may comprise an offload indication indicative that a data unit of the first protocol data unit set to be discarded by the radio access network node is to be offloaded from the first protocol data unit set for transmission by the radio access network node to the user equipment via the second resource. The protocol data unit discard indication may be indicative that an out-of-sequence data unit, comprising the first protocol data unit set identifier being received via the first resource is to be indicative of a data unit of the first protocol data unit set having been discarded by the radio access network node being a discarded data unit. The received out-of-sequence data unit may comprise the first protocol data unit set identifier and received out-of-sequence data unit may be received via the first resource. The operations may further comprise, based on the received out-of-sequence data unit comprising the first protocol data unit set identifier and being received via the first resource, receiving, via the second resource, at least one discarded data unit of the first protocol data unit set discarded by the radio access network node.

BRIEF DESCRIPTION OF THE DRAWINGS

FIG. 4 illustrates an example environment with a user equipment configured to receive from a radio access network node flows of a communication session.

FIG. 6B illustrates an example downlink control information message comprising an automatic packet discard indication indicative of specific resources associated with specific flows to which automatic packet discarding may be applied.

FIG. 7 illustrates a timing diagram of an example method to discard packets of a traffic flow without out-of-sequence packets triggering negative-acknowledgement messaging at a receiving device.

FIG. 8 illustrates a timing diagram of an example method to offload discarded packets to an alternative traffic flow.

FIG. 10 illustrates a block diagram of an example method.

FIG. 11 illustrates a block diagram of an example communication device.

FIG. 12 illustrates a block diagram of an example non-transitory machine-readable medium.

FIG. 13 illustrates a block diagram of another example method.

FIG. 14 illustrates a block diagram of an example user equipment.

FIG. 15 illustrates a block diagram of another example non-transitory machine-readable medium.

DETAILED DESCRIPTION OF THE DRAWINGS

Figure 1:
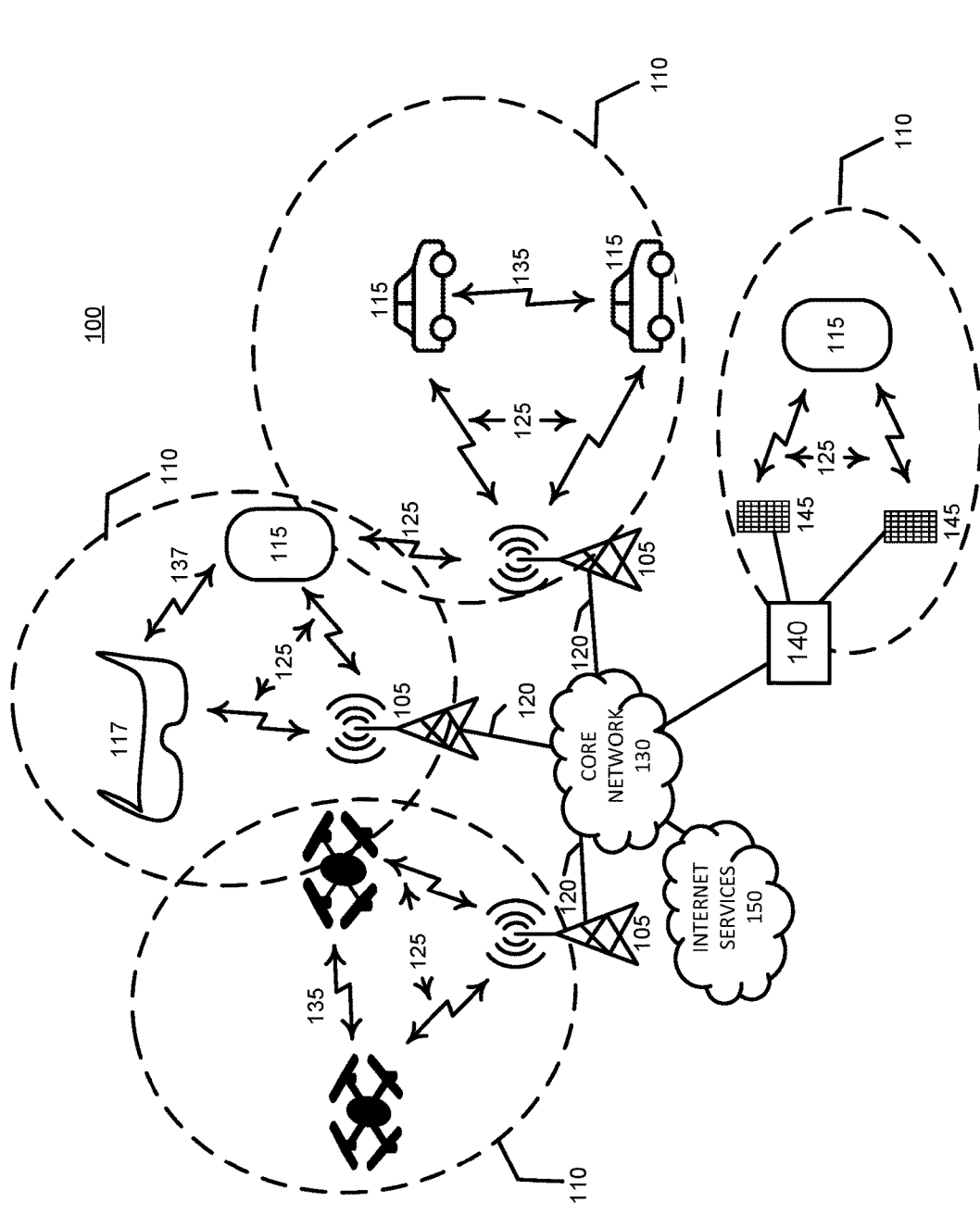
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

The PDCCH of a 5G NR system may deliver downlink and uplink control information to cellular devices. Compared to the control channel design of the fourth generation (e.g., LTE), the 5G control channel can match requirements of the URLLC and eMBB use cases and can offer an efficient coexistence between those different QoS classes.

The 5G PDCCH channel, unlike the Fourth Generation control channel, may be beamformed using favored-channel vectors of each UE, with embedded demodulation-assisting demodulation reference signals ("DMRS"). The PDCCH may be modulated by a fixed QPSK modulation scheme and with a conservative coding rate such as the reliability of receiving the PDCCH channel at a UE device is maximized. For example, to satisfy a URLLC 10e-5 reliability level, the PDCCH channel decoding ability may be enhanced at the device end.

The resource size of each PDCCH channel, which may be carrying the downlink control information ("DCI") of one or more UEs, may be time-varying, and may be referred to as PDCCH aggregation level. In particular, and to enhance PDCCH decoding, the network may increase the resource size of the PDCCH channel and accordingly adopt a more conservative and resource-less-efficient coding rate of the PDCCH. This implies that same amount of PDCCH control information is transmitted with a stronger coding rate (i.e., more redundant bits for error detection and correction) at the expense of consuming more channel resources for transmitting the PDCCH information.

There are two types of PDCCH channels. First, the UE-specific PDCCH, where a set channel resources are periodically monitored by a single UE/device. After being configured, the device will attempt to blindly decode those candidate resources in case they may be potentially carrying DCI information. This DCI information includes configurations on scheduled uplink or downlink grants, transmission configurations, and information on common system signaling and updates. Furthermore, the blind decoding is the process when the UE attempts decoding the DCI with all possible transmission configurations and aggregation levels.

This implies a heavy power consumption on the device end; however, it is necessary because the UE is not yet aware about the actual configurations of the PDCCH channel and corresponding transmissions. It shall be aware of such after it successfully decodes the PDCCH. In the active mode, the UE may monitor the configured one or more PDCCH search spaces, where a search space implies a set of candidate resources that may carry the PDCCH/DCI information. The search space definitions may be used to refer to varying size of the PDCCH channel (i.e., aggregation levels) and hence, the required size of resources to carry the PDCCH may vary.

Common PDCCH search spaces are monitored by all UEs. Those common PDCCH channels typically carry DCI information that are relevant to all devices. Examples include system updates and control information, all-UE power control information, and general system information.

For each scheduled downlink or uplink transmission, there typically is a preceding PDCCH control transmission informing the UE device about resources scheduled by the network for the transmission, and transmission configurations to use for transmission in the uplink or reception in the downlink. Accordingly, the PDCCH transmissions are considered as signaling overhead, which should be always minimized, and needed for successful device transmission and/or reception.

As an example use case that illustrates example embodiments disclosed herein, Virtual Reality ("VR") applications and VR variants, (e.g., mixed and augmented reality) may at some time perform best when using NR radio resources associated with URLLC while at other times lower performance levels may suffice. A virtual reality smart glass device may consume NR radio resources at a given broadband data rate having more stringent radio latency and reliability criteria to provide a satisfactory end-user experience.

5G systems should support 'anything reality' ("XR") services. XR services may comprise VR applications, which are widely adopted XR applications that provide an immersive environment which can stimulate the senses of an end user such that he, or she, may be 'tricked' into the feeling of being within a different environment than he, or she, is actually in. XR services may comprise Augmented Reality ('AR') applications that may enhance a real-world environment by providing additional virtual world elements via a user's senses that focus on real-world elements in the user's actual surrounding environment. XR services may comprise Mixed reality cases ("MR") applications that help merge, or bring together, virtual and real worlds such that an end-user of XR services interacts with elements of his, or her, real environment and virtual environment simultaneously.

Different XR use cases may be associated with certain radio performance targets. Common to XR cases, and unlike URLLC or eMBB, high-capacity links with stringent radio and reliability levels are typically needed for a satisfactory end user experience. For instance, compared to 5 Mbps URLLC link with a 1 ms radio budget, some XR applications need 100 Mbps links with a couple of milliseconds of allowed radio latency. Thus, 5G radio design and associated procedures may be adapted to the new XR QoS class and associated performance targets.

An XR service may be facilitated by traffic having certain characteristics associated with the XR service. For example, XR traffic may typically be periodic with time-varying packet size and packet arrival rate. In addition, different packet traffic flows of a single XR communication session may affect an end user's experience differently. For instance, a smart glass that is streaming 180-degree high-resolution frames may use a large percentage of a broadband service's capacity for fulfilling user experience. However, frames that are to be presented to a user's pose direction (e.g., front direction) are the most vital for an end user's satisfactory user experience while frames to be presented to a user's periphery vision have less of an impact on a user's experience and thus may be associated with a lower QoS requirement for transport of traffic packets as compared to a QoS requirement for transporting the pose-direction traffic flow. Therefore, flow differentiation that prioritizes some flows, or some packets, of a XR session over other flows or packets may facilitate efficient use of a communication system's capacity to deliver the traffic. Furthermore, XR capable devices (e.g., smart glasses, projection wearables, etc.) may be more power-limited than conventional mobile handsets due to the limited form factor of the devices. Thus, techniques to maximize power saving operation at XR capable device is desirable. Accordingly, a user equipment device accessing XR services, or traffic flows of an XR session, may be associated with certain QoS metrics to satisfy performance targets of the XR service in terms of perceived data rate or end to end latency and reliability, for example.

High-capacity-demanding services, such as virtual reality applications, may present performance challenges to even 5G NR capabilities. Thus, even though 5G NR systems may facilitate and support higher performance capabilities, the radio interface should nevertheless be optimized to support extreme high capacity and low latency requirements of XR applications and XR data traffic.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LIE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR, appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to for the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UP 115 may be stationary, or mobile, or both at different times. UEs 115 may be devices in different forms or having different capabilities. Sone example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g. via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1, 4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA). LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RSS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
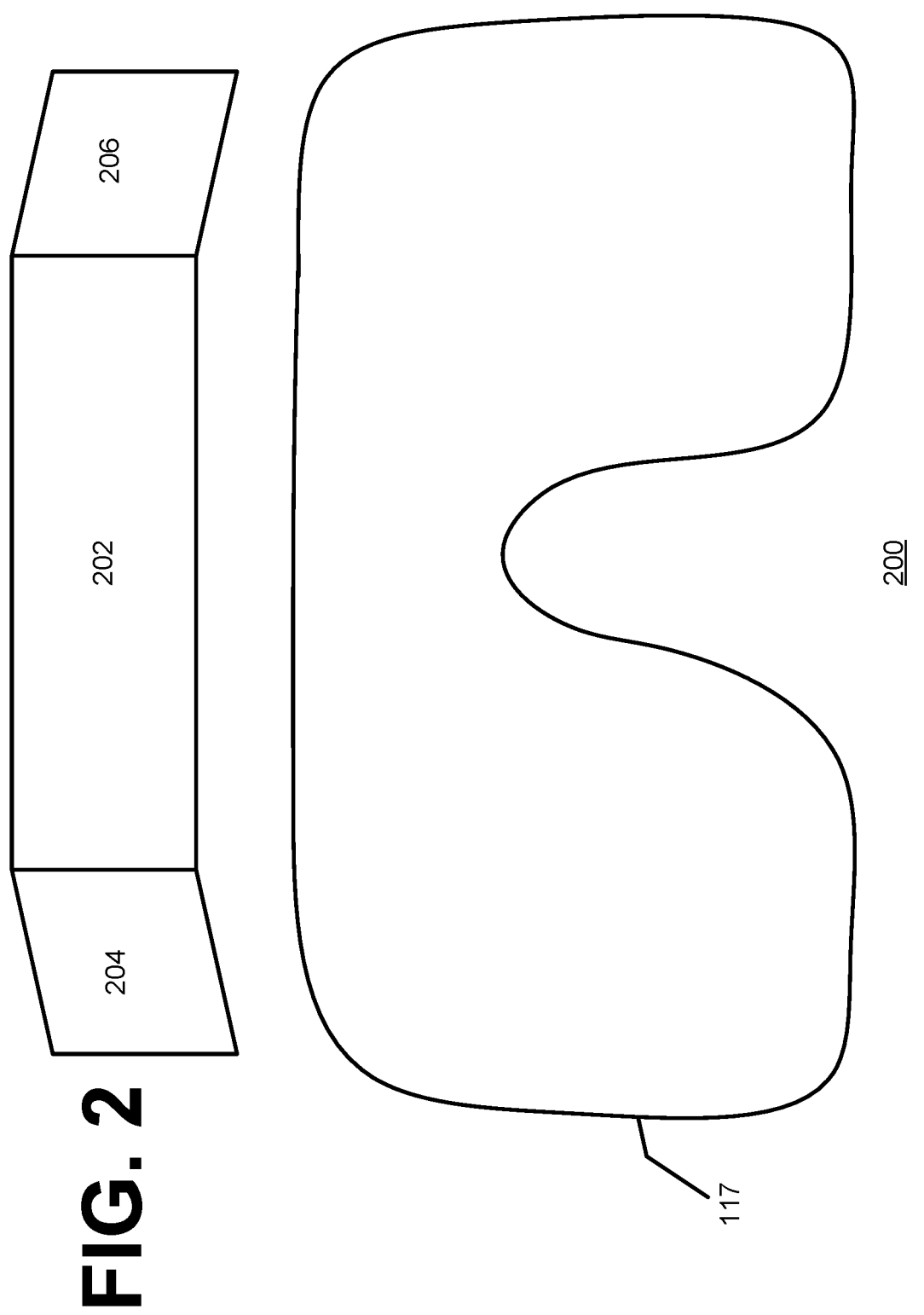
FIG. 2 illustrates an example virtual reality appliance.

Turning now to FIG. 2, the figure illustrates a virtual reality ("VR") application system 200. In system 200, wearable VR appliance 117 is shown from a wearer's, or viewer's, perspective. VR appliance 117 may comprise a center, or pose, visual display portion 202, a left visual display portion 204 and a right visual display portion 206, that may be used to display main visual information, left peripheral visual information, and right peripheral visual information, respectively. As shown in the figure, the portions 202, 204, and 206 are delineated by distinct lines, but it will be appreciated that hardware or software may facilitate gradual transition from main and peripheral information display.

As discussed above, different XR use cases may require different corresponding radio performance. Typically, for XR use cases but unlike for URLLC or eMBB use cases, high-capacity radio links that carry XR data traffic (e.g., data flows that comprise visual information) with stringent radio levels (e.g., latency) and reliability levels are required for a reasonable end user experience. For example, compared to 5 Mbps URLLC link with a 1 ms radio latency budget, some XR applications require 100 Mbps links with about 2 mS allowed radio latency.

From research, several characteristics have been determined that for XR data traffic: (1) XR traffic characteristics are typically periodic with time-varying packet size and packet arrival rate; (2) XR capable devices may be more power-limited than conventional mobile handsets, (e.g., smart glasses, projection wearables, etc.) due to the limited form factor of the devices; (3) multiple data packet flows corresponding to different visual information of a given XR session are not perceived by a user as having the same impact on the end user experience.

Thus, in addition to needing XR-specific power use efficiency, smart glasses, such as wearable appliance 117, streaming 180-degree high-resolution frames requires broadband capacity for providing an optimum user experience. However, it has been determined that data corresponding to the frames that carry main, or center visual information (i.e., the pose or front direction) are the most vital for end user satisfaction, while the frames corresponding to peripheral visual information have a lesser impact on a user's experience. Therefore, accepting higher latency for less important traffic flows so that resources that would otherwise be allocated to the less important traffic flows can be used for traffic flows corresponding to more important traffic, or to devices that carry the more important traffic, may be used to optimize overall capacity and performance of a wireless communication system, such as a 5-G communication system using NR techniques, method, systems, or devices. For example, a wireless data traffic flow carrying visual information for display on center, or pose, visual display portion 202 may be prioritized higher than a wireless data traffic flow carrying visual information for left visual display portion 204 or for right visual display portion 206.

The performance of a communication network in providing an XR services may be at least partially determined according to satisfaction of a user of the XR services. Each XR-service-using user device may be associated with certain QoS metrics to satisfy the performance targets of the user's service, in terms of perceived data rate, end-to-end latency, and reliability.

A 5G NR radio system typically comprises a physical downlink control channel ("PDCCH"), which may be used to deliver downlink and uplink control information to cellular devices. The 5G control channel may facilitate operation according to requirements of URLLC and eMBB use cases and may facilitate an efficient coexistence between such different Qos classes.

Packet Ordering.

Packet ordering is a radio function in cellular telephony systems and packet sequencing refers to a communication device, such as a user equipment (a receiving device can also be a computing device at a RAN node) receiving incoming transport blocks that comprise packets that are sequentially numbered (e.g., each packet is temporally numbered with a next number of an incrementing count as the packet is transmitted). At a communication device such as a RAN node (or could be a user equipment) transmitting a traffic flow, a first sequence number of a first packet of a traffic flow may be a random number. A next sequence number corresponding to a temporally transmitted next packet of the traffic flow may be the initial sequence number plus one, for example, or the next sequence number may be a number relative to, or offset with respect to, the initial number (e.g., the initial sequence number plus a number corresponding to the size, in number of bytes, of the first packet). Similarly, the third sequence number corresponding to the third packet of the traffic flow may be the initial sequence number plus two, or an offset with respect to the second sequence number, and so on. For purposes of discussion herein, sequence numbers may be referred to a sequentially incrementing numbers, but it will be appreciated that a sequence number may be based on a packet size, in terms of bytes, of a previous packet in a traffic flow and that previous packet's sequence number. A receiving device of the traffic flow 'expects" to receive packets of the traffic flow in sequence (e.g., in order as the packets were transmitted). Packet ordering enables multiple radio performance advantages, such as the transmitting device, for example a radio access network node can transmit multiple packets of multiple traffic flows without losing track of dropped packets and correctly decoded packets based the packet sequencing numbering. Reliability of radio transmission may be enhanced by retransmitting packets that may have been dropped based on sequence numbers corresponding to the dropped packets.

If a communication device receives an out-of-sequence packet (e.g., there is a gap between a sequence number of a most recently received packet and a sequence number of a second most recently received packet), the receiving communication device may identify packet sequence numbers corresponding to sequence numbers between the sequence number of the second most recently received packet and the sequence number of the most recently received packet. The communication device that received the out-of-sequence sequence packets, may indicate to the communication device that transmitted the packets of the traffic flow that packets corresponding to the sequence numbers between the sequence numbers corresponding to the two most recently received packets were not received. A communication device receiving the traffic flow may start a wait timer to allow time for out-of-sequence packets to arrive before sending an indication to the communication device transmitting the packet flow that packets corresponding to the missing sequence numbers were not received. The receiving communication device may continue receiving packets while waiting for possibly receiving the packets. A wait timer may be used to account for packets that may have a longer transmission time than others of a given traffic flow due to, for example, longer, or different, channel paths than other packets, and hence, may eventually arrive out of sequence at the receiving communication device. Upon expiration of a wait timer, a receiving communication device may trigger transmission of a negative acknowledgement ("NACK") indication of the dropped packets. Upon receipt of one or more NACKs by the communication device transmitting packets of the traffic flow (e.g., a RAN node), the transmitting device may trigger retransmission of packets corresponding to the sequence numbers indicated in a NACK. Accordingly, a default behavior of communication devices may be to assume that after a wait timer expires, packets corresponding to missing sequence numbers that have not been received have been dropped due to channel fading, congestion, or interference, and thus retransmissions of packets not received should be performed.

Packet 'discarding' refers to a transmitting communication device determining to exclude from transmission of one or more packets of a traffic flow towards a receiving communication device. Discarding contrasts with dropping insofar as a dropped packet is a packet that is transmitted by a transmitting communication device but is lost during transmission, or at least arrives after a wait timer at a receiving device may expire, whereas a discarded packet is never transmitted by the transmitting device. Packet discarding can be attributed to a packet of a traffic flow being buffered at a transmitting device, due to network conditions, for example, longer than a maximum allowable latency corresponding to the traffic flow, such that the tardy packets are deemed not useful to the receiving communication and are therefore discarded from the buffer without being transmitted. Thus, the transmitting communication device proceeds with transmitting packets (e.g., packets having higher sequence numbers than the discarded packets).

At a receiving device, packets having out-of-sequence packet numbers are received, and thus, packet recovery procedures that may be triggered by receiving an out-of-sequence sequence number may result in processing load and signaling overhead being imposed on the receiving device as well as the transmitting device to accommodate receiving devices transmitting, and transmitting devices receiving, retransmission requests in the uplink direction. In case of determined/intentional packet discarding, packet recovery procedures are unnecessary since packets are not dropped because of poor radio conditions but discarded because the packets would arrive too late at a receiving device to be useful. When such discarding of packets held in a buffer too long happens infrequently, device processing and packet recovery signaling overhead may not be problematic. However, with extended reality services or service classes that characterize traffic of multi-purpose multi-priority flows, determined/intentional packet discarding at the transmitting device (e.g., a RAN node) side may occur frequently enough to have a negative impact on network performance generally as well as a negative impact on transmission performance corresponding to a traffic flow from which the discarded packets are discarded. Certain traffic flows may have stringent latency targets, or latency budgets. A latency budget or target may be referred to as a criterion, such as a threshold or a limit. When a packet has been in a buffer corresponding to transmission longer than permitted by a configured latency criterion due to scheduling delays resulting from limited network resource availability, the packet may be intentionally discarded. Conventionally, receiving devices, such as user equipment devices, may be configured to treat packets having out-of-sequence numbers as being indicative of dropped packets accordingly trigger needless processing and overhead packet recovery procedures.

Accordingly, embodiment disclosed herein facilitate device-aware packet discarding and packet offloading that may increase efficient use of processing resources and network resources. As discussed above, existing communications devices may implement device-unaware packet discarding (e.g., a receiving device in unaware of intentional discarding by a transmitting device), which may result in receiving devices always triggering processing, latency, and signaling overhead-inefficient packet recovery procedures, that are unnecessary with respect to intentional discarding of packets as compared to dropping of packets due to poor communication channel conditions. With multi-priority multi-purpose traffic flows (for XR services for example), intentional packet discarding typically occurs frequently causing triggering of packet recovery procedures. Embodiments disclosed herein minimize inefficient triggering of unnecessary packet recovery procedures by implementing device-aware packet discarding or packet offloading.

Dynamic Packet Re-Ordering, Discarding, and Flow Offloading.

Embodiment disclosed herein facilitate a receiving communication device, such as, for example, a user equipment, only triggering processing-heavy, overhead-heavy packet recovery procedures for unintentionally dropped packets, for example due to due to poor channel conditions, corresponding to a traffic flow that is configured for high reliability. For purposes of description and example, a RAN node may refer to a transmitting communication device and a user equipment, such as a mobile smartphone, may refer to a receiving communication device, however it will be appreciated that a user equipment may be a transmitting device and a RAN node may be a receiving device.

For a multi-purpose, multi-priority traffic flow session, for example a session that may facilitate XR traffic, as part of establishing a communication session, a RAN node may configure a user equipment with traffic flow identifiers corresponding to traffic flows of the session. Some traffic flows corresponding to a session may be used to deliver traffic for which discarding of packets is acceptable and other traffic flows corresponding to the session may be used to deliver traffic for which discarding of packets is not acceptable. Session configuration information received from the RAN node may indicate, via a packet discard indication in a configuration corresponding to a session that comprises a traffic flow, that the traffic flow is susceptible to packets corresponding thereto being intentionally discarded if packet discarding is deemed acceptable for the traffic flow (based on an application at the user equipment, for example). Accordingly, for a traffic flow indicated by a packet discard indication as being configured, as a default, for packet discarding, or automatic discarding, a user equipment receiving packets of the indicated traffic flow may not trigger, or may refrain from triggering, packet recovery procedures (e.g., the starting of a wait timer or the sending of a NACK message) even when receiving out-of-sequence packets corresponding to the indicated flow identifier, or corresponding to a protocol data unit ("PDU") set identifier (e.g., an identifier of a set of, or a flow of, protocol data units, such as for example, packets, segments, datagrams, and the like).

Instead of performing packet recovery procedures when receiving an out-of-sequence packet of a given traffic flow, a receiving user equipment may treat absent, or missing, packets corresponding to skipped packet sequence numbers of the flow as having been intentionally discarded by the transmitting RAN node and thus not request retransmission of the missing packets of the traffic flow.

For PDU set identifiers, or traffic flow identifiers, that are not configured for packet discarding as a default, a user equipment may trigger packet recovery procedures upon receiving an out-of-sequence packet. Such a flow identifier typically is associated with a reliability-critical flow for which PDUs must be received and for which discarding is not acceptable. Even if violation of a stringent latency requirement is imminent for a packet/PCU, the packet may nevertheless be useful at a receiving communication device and thus, even after the packet's latency budget has been exceeded, packet discarding at the transmitting RAN node is not triggered for traffic flows that are not configured according to a packet discard indication as being susceptible, as a default, to intentional packet discarding.

For such a situation in which a traffic flow is not configured, as a default, for packet discarding (which may be referred to as automatic discarding), but general per-packet buffering latency is large, thus resulting in violation of latency budgets of some packets being imminent, it is likely that the communication network comprising the RAN node is experiencing resource starvation, for example due to resource congestion. Accordingly, an embodiment further enables a RAN node to transmit packets for which a corresponding latency budget violation is imminent by dynamically switching transmission of packets that are about to violate their respective latency budgets from an original, or first, traffic flow to a different, or second, traffic flow, for example to a traffic flow corresponding to a data radio bearer ("DRB") that has been configured for a high capacity but that may be configured for a lower reliability that the first traffic flow. Such dynamic packet-specific flow switching facilitates transmission, by the RAN node, of packets that must be transmitted in a faster way via another active traffic flow, potentially with lower reliability performance but with a resulting reduction of scheduling resource use and with the packet more likely to be received by a user equipment than if the packet is discarded without attempting to transmit the packet via the different traffic flow.

At the receiving user equipment, flow switching information may be indicated dynamically, 'on-the-fly.' Indication of dynamic flow switching may facilitate user equipment determining which packets are to be transmitted via which flow/DRB, and thus determining adoption of flow-specific, or DRB-specific, receiving configurations to be used for receiving discarded packets via a different traffic flow. Accordingly, even during severe resource congestion conditions, transmission of reliability-critical packets may be dynamically switched to a different traffic flow, albeit, to a flow having potentially a lower reliability, thus clearing the reliability-critical packets from a RAN node's scheduling buffer as an alternative to retaining the packets in the buffer for an undetermined period. Using dynamic packet switching embodiments disclosed herein, packets can be dynamically switched to less congested active traffic flows, and therefore, be scheduled and transmitted sooner than if the packets remain in a scheduling buffer until network conditions improve, but with a slight trading off of flow reliability. Embodiments disclosed herein may be implemented using novel control channel signaling.

Figure 3A:
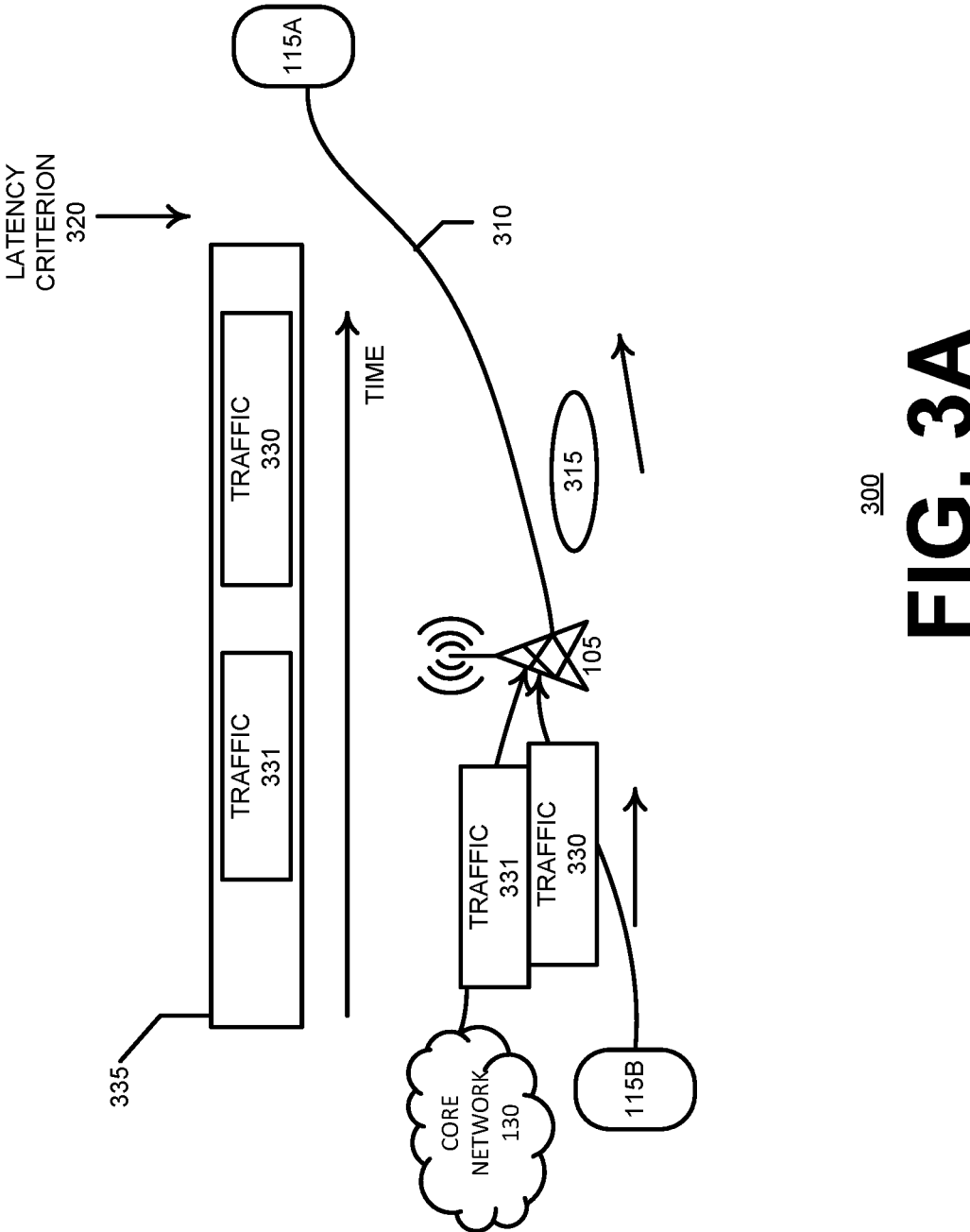
FIG. 3A illustrates an example environment with a user equipment configured to receive from a radio access network node a traffic corresponding to a communication session.

FIG. 3A illustrates an example environment 300 with a user equipment 115A configured to receive from a radio access network node 105 a traffic flow of a communication session. As an example, traffic directed to UE 115A may be received by RAN 105 from core network 130, or from another user equipment UE 115B. RAN 105 and UE 115A may establish a communication session 310 comprising multiple traffic flows. Session 310 may facilitate, for example, an XR session with different traffic flows being associated with different corresponding qualities-of-service. For example, a traffic flow that facilitates a center portion of a smart glass appliance may correspond to a different quality of service than a traffic flow that facilitates a peripheral portion of a smart glass appliance. Traffic flows 330 and 331 are shown in FIG. 3A as overlapping to indicate that the flows typically originate from the same device and thus would either be received by RAN 105 from either UE 115B or core network 130. However, flows 330 or 331 may originate from different devices and may be received by RAN 105 from different sources, for example network 130 or UE 115B.

During establishment of communication session 310 radio access network node 105 may transmit to user equipment 115A packet discard indication 315 corresponding to one of traffic flows 330 or 331, which indicated traffic flow may be referred to as a first traffic flow. For example, traffic flow 330 may be configured to deliver packets corresponding to a use having a tight, or stringent, latency budget (e.g., a low tolerance for latency). In an embodiment, packet discard indication 315 may comprise information to be used in conjunction with a novel information element that may be part of a downlink control information format, which may comprise information elements related to functionality of a user equipment other than packet discarding. In another embodiment, a radio access network node may transmit to a user equipment a novel downlink control channel format that may convey packet discard indication 315. In other embodiments, packet discard indication 315 may be transmitted via a non-DCI message.

Packet discard indication 315 may be transmitted to UE 115A and may indicate to the UE that out-of-sequence packets received via traffic flow 330 should not trigger a wait timer, transmitting a NACK, or other procedures corresponding to retransmission of a missing packet. The latency budget is represented by criterion 320 and the corresponding arrow in FIG. 3A pointing to box 335, which box 335 represents a scheduling buffer of radio access network node 105. As shown in FIG. 3A, at least one packet of traffic flow 330 has been in buffer 335 almost as long as corresponding latency budget criterion 320 allows. It will be appreciated that latency criterion 320 may correspond to traffic flow 330 but not necessarily traffic flow 331.

Figure 3B:
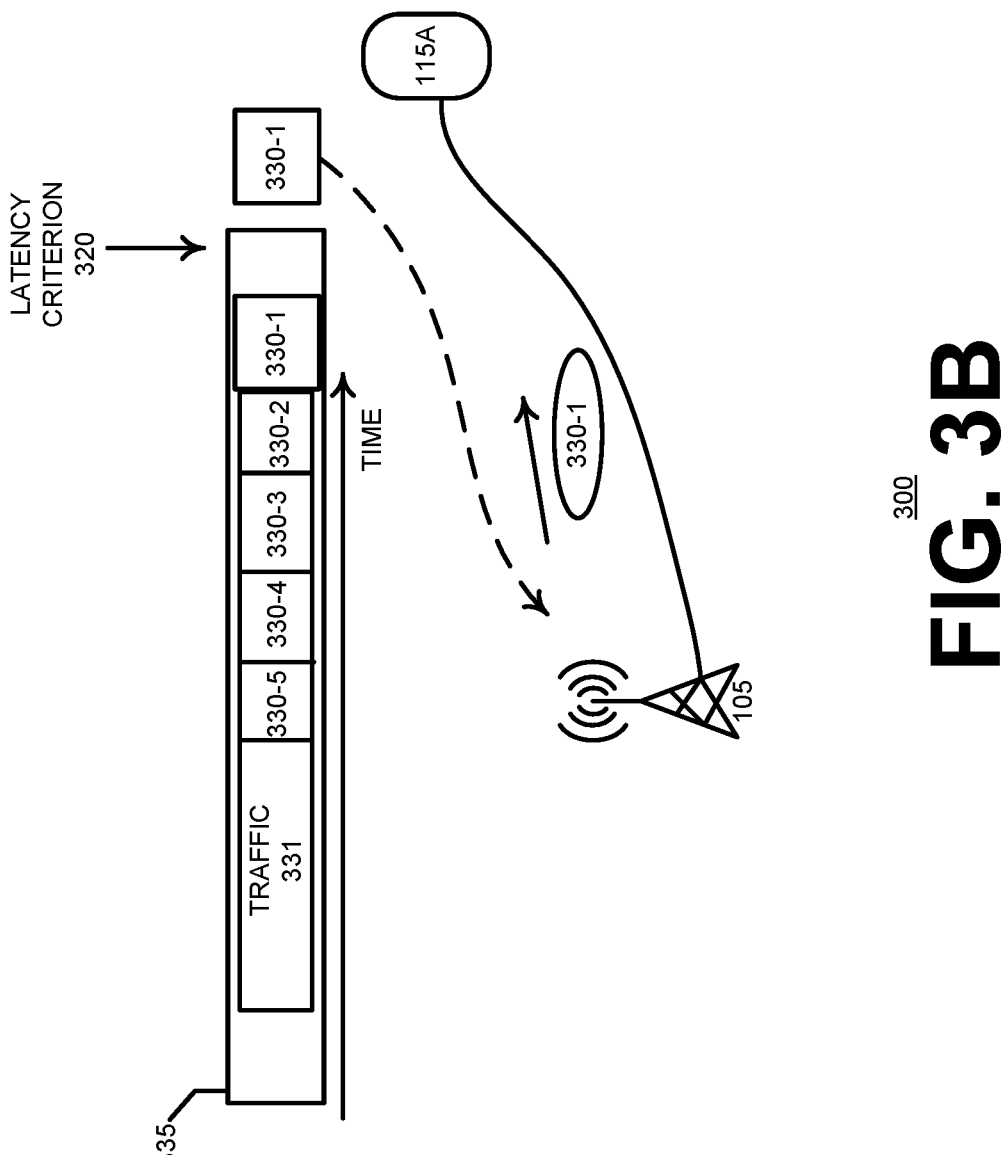
FIG. 3B illustrates an example environment with a user equipment receiving from a radio access network node a traffic packet corresponding to a communication session.
Figure 3C:
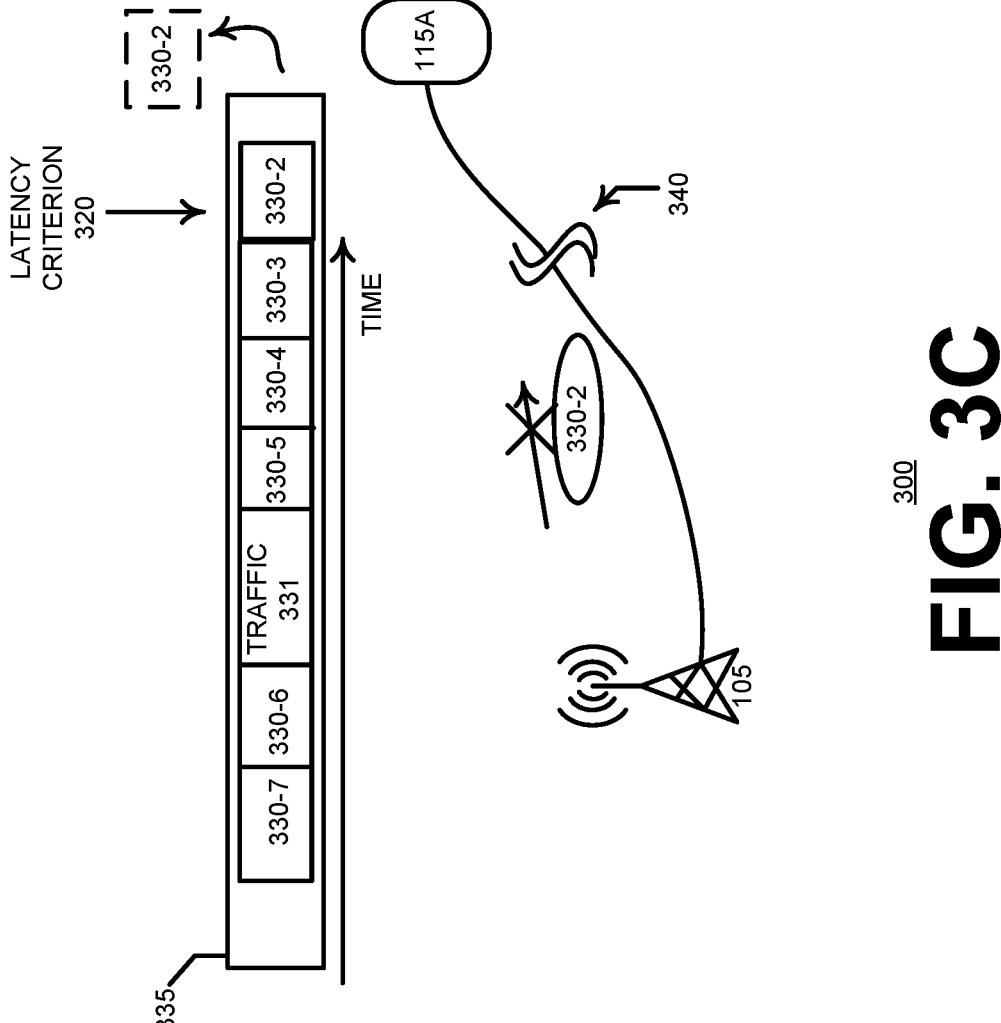
FIG. 3C illustrates an example environment with a radio access network node discarding a traffic packet corresponding to a communication session due to network congestion and violation of a latency budget.
Figure 3D:
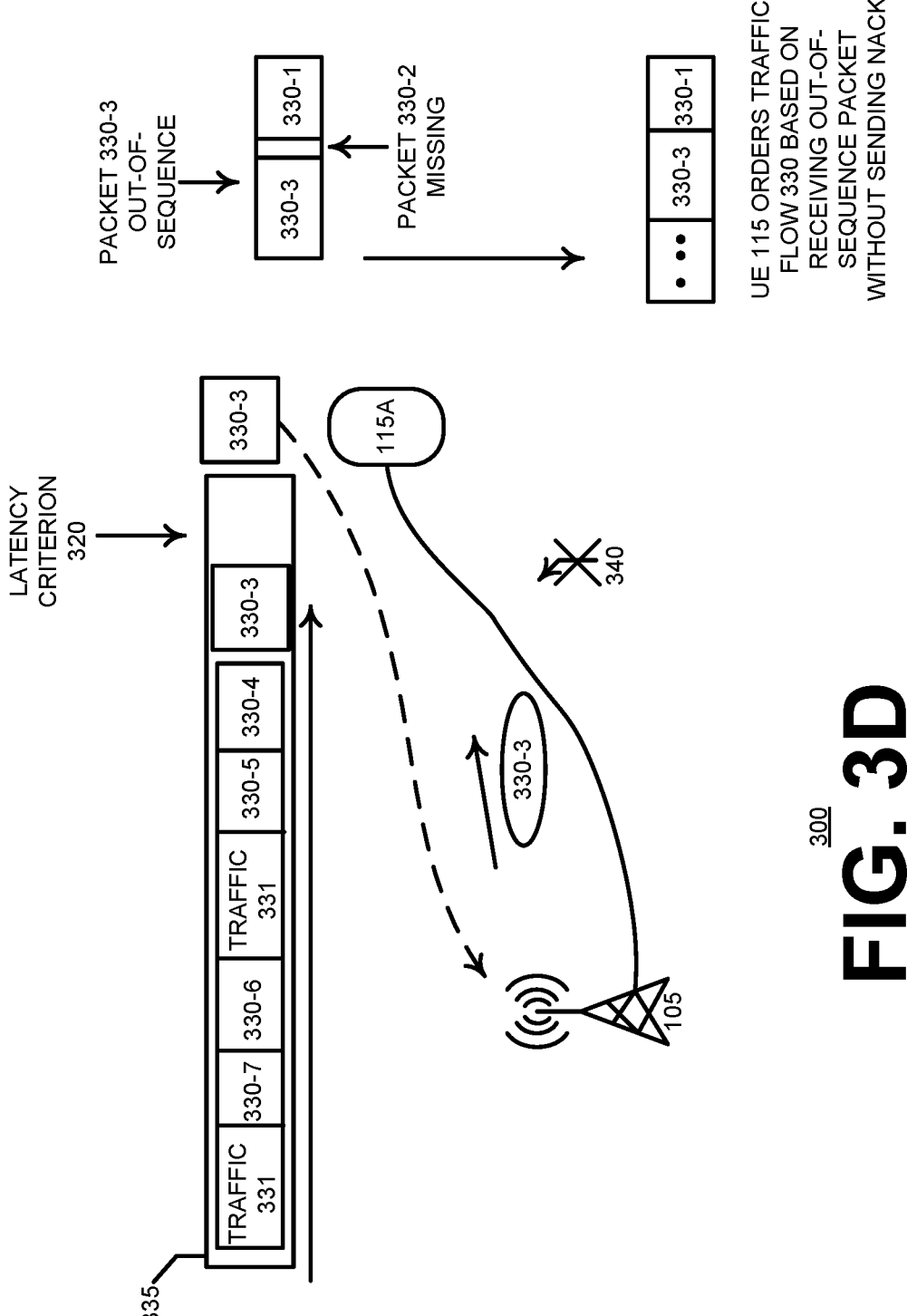
FIG. 3D illustrates an example environment with a user equipment receiving from a radio access network node am out-of-sequence traffic packet corresponding to a communication session.

As shown in FIG. 3B, packet 330-1, of traffic flow 330, which did not exceed latency criterion 320 because the packet had not been stored in buffer 335 longer than allowed by a latency budget 320 corresponding to traffic flow 330, RAN 105 moves packet 330-1 out of the buffer and transmits the packet to UE 115A. However, as shown in FIG. 3C, as time has passed, packet 330-2 has been stored in buffer 335 longer than latency criterion 320 due to network congestion 340 preventing RAN 105 from successfully transmitting packet 330-2. Accordingly, RAN 105 discards packet 330-2 from buffer 335 and does not transmit packet 330-2 to UE 115A. As shown in FIG. 3D, network congestion 340 has abated and because packet 330-3 has not been in buffer 335 longer than allowed by criterion 320, RAN 105 transmits packet 330-3 to UE 115A.

UE 115A receives packet 330-3 and determines that most-recently-received packet 330-3 is out-of-sequence because packet 330-1 is a second most recently received packet—the user equipment did not receive a packet having sequence number 330-2. However, based on having received packet discard indication 315, as shown in FIG. 3A, instead of user equipment 115A initiating a wait timer, and after the wait timer expires transmitting a NACK to radio access network node 105, as shown in FIG. 3D UE 115A places packets of traffic flow 330 in order with packet 330-3 immediately following packet 330-1 and proceeds to process traffic flow 330 without packet 330-2. Accordingly, based on having received packet discard indication 315, UE 115A does not expend processing resources or network resources for requesting retransmission of packet 330-2. Furthermore, user equipment 115A does not spend time buffering packet 330-3 while waiting to receive packet 330-2.

Figure 4:
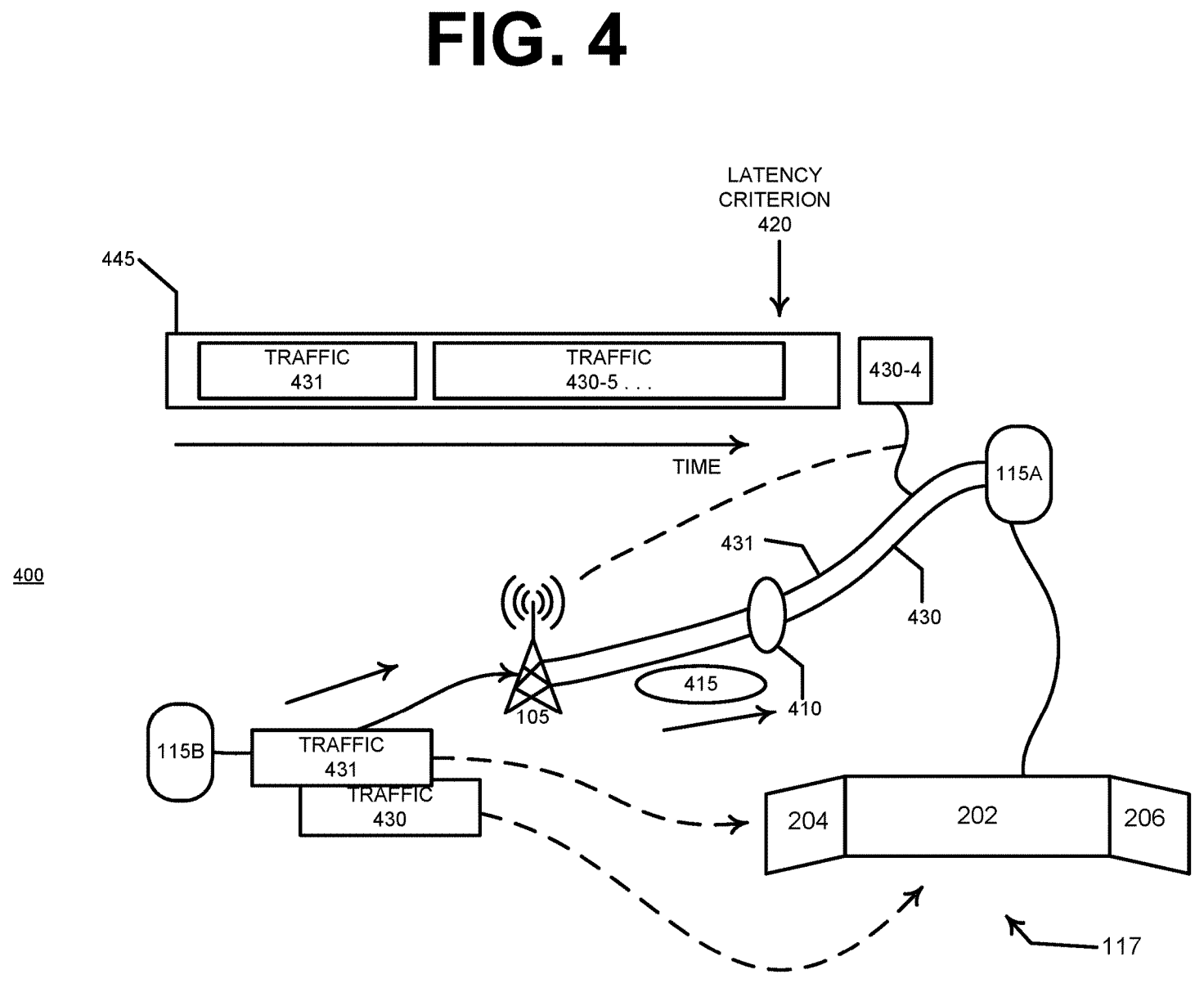

FIG. 4 illustrates an example environment 400 with a user equipment 115A configured to receive from a radio access network node 105 one or more traffic flows 430 and 431 of a communication session 410. RAN 105 may transmit to UE 115A a packet discard indication 415, that may configure a flow, for example traffic flow 430, to be subject to packet discarding by the RAN as a default packet-handling protocol for traffic flow 430. Traffic flow 430 may be configured to carry packets directed to user equipment 115A to be displayed on center portion 202 of smart glass appliance 117. Traffic flow 431 may be configured to carry packets directed to UE 115A to be displayed on peripheral portion 204 of smart glass appliance 117. As packets corresponding to traffic flow 430 and traffic flow 431 are received at radio access network node 105 for transmission to UE 115A, the radio access network node may store packets of the traffic flows into scheduling buffer 445. A packet corresponding to traffic flow 430 may be discarded by radio access network node 105 if the packet stays in buffer 445 beyond the time permitted by latency criterion 420. Packet discard indication 415 may configure UE 115A to recognize that packets of traffic flow 430 are subject to packet discarding such that instead of the UE requesting packet retransmission if the UE, or an application executing thereon, determines that a packet is missing based on receiving an out of sequence packet of traffic flow 430. Configuring traffic flow 430 for packet discarding by radio access network node 105 may be desirable for traffic directed to center portion 202 of smart glass appliance 117 because perception by a user of the smart glass appliance may be negatively impacted more by delay in waiting for an out-of-sequence packet to be received than by the center portion not rendering information that may have been contained in a discarded packet.

However, although delay in receiving a packet that may have violated a latency criterion may be more problematic to a user of smart glass appliance 117 than not receiving the packet such that later packets of the flow are received without delay that violates a configured latency budget, receiving of the packet by UE 115A may nevertheless be desirable. Accordingly, radio access network node 105 may determine to transmit a packet of traffic flow 430 according via traffic flow 431 instead of via traffic flow 430, thus offloading transmission of an otherwise discarded packet to resource sets allocated to a different traffic flow. As shown in FIG. 4, packet 430-4 of traffic flow 430 has been held in buffer 445 beyond a time permitted by latency criterion 420 as indicated by packet 430-5 being itself about to violate the latency criterion. For purposes of illustration, it is assumed that packets 430-1-430-3 have already either been transmitted, discarded, or offloaded. RAN 105 discards packet 430-4 from traffic flow 430 but proceeds to transmit packet 430-4 via traffic flow 431 instead. Thus, a user of appliance 117 may not experience a negative impact when looking at information displayed by center portion 202 because packets having higher sequence numbers than 430-4 may be transmitted via traffic flow 430 with minimal delay (due to not requesting, and waiting for, retransmission from RAN 105 of packet 430-4) while packet 430-4 may nevertheless be transmitted via traffic flow 431. UE 115A can determine when, and if, packet 430-4 is received via traffic flow 431 whether to use the packet.

Figure 5:
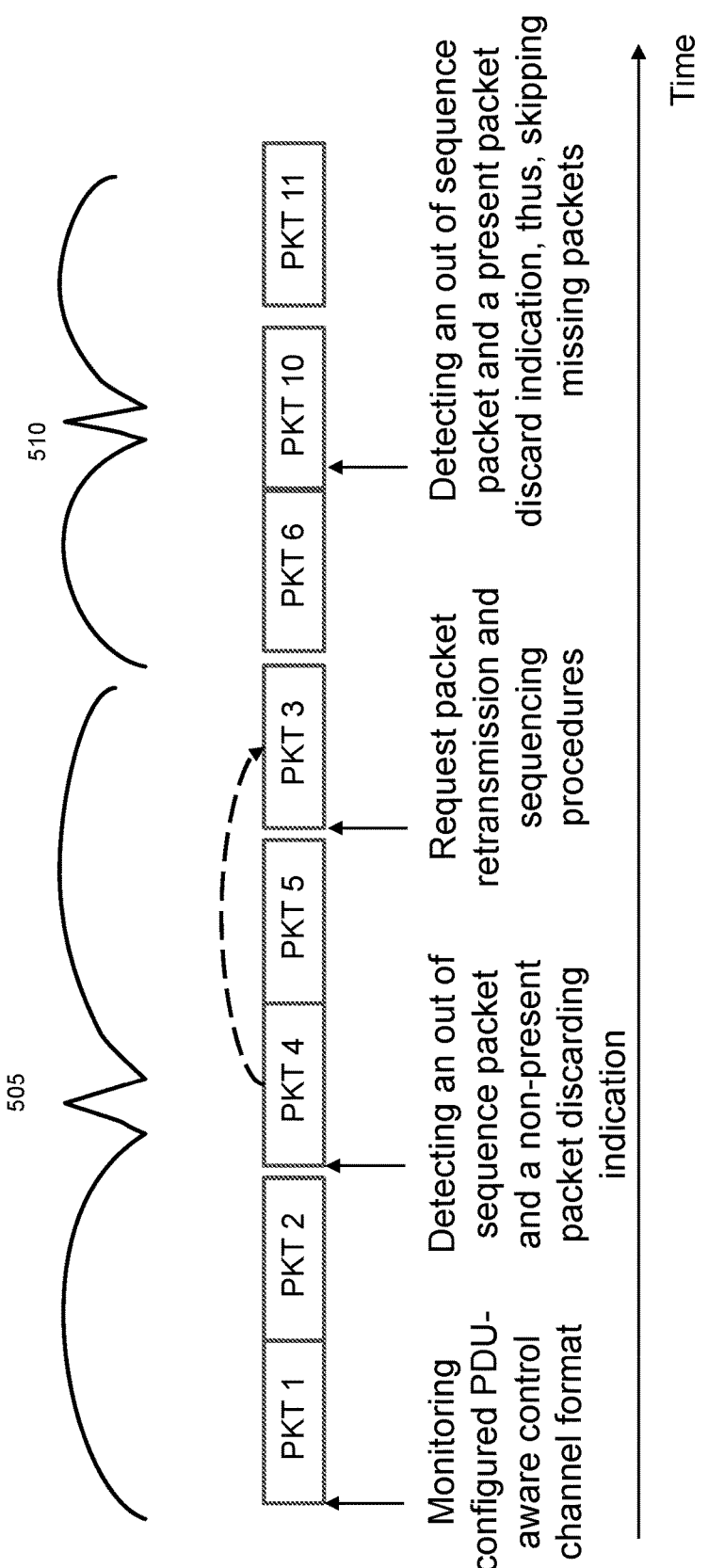
FIG. 5 illustrates handling of out-of-sequence packets of a traffic flow.

FIG. 5 illustrates handling of out-of-sequence packets of a traffic flow session 500. FIG. 5 depicts an example of overall behavior of a receiving communication device according to a dynamic packet discarding embodiment receiving packets of flow 510 as compared to requesting missing packet retransmission for missing packets of flow 505. At act 20, a receiving device typically monitors and attempts blind decoding a configured control channel and extracts PDU set identifiers, flow identifiers, or QCI identifiers for which resources are granted. The receiving device may then determine whether automatic packet discarding is enabled as a default for one or more of the identifiers extracted from the control channel signaling, based on an indication, such as a packet discard indication 315 or 415 described in reference to FIG. 3A or FIG. 4, respectively, which indication may be received from a serving RAN node via RRC messaging. A packet discard indication may be indicative of a PDU set identifier, a flow identifier, or a QCI identifier corresponding to a flow being designated for, or subject to, intentional packet discarding by the RAN.

For example, at act 21, the receiving device may detect and decoded an out-of-sequence packet, during an active resource grant, (e.g., the receiving device receives packet PKT 4 after PKT 2 but PKT 3 is missing from flow 505 (e.g., PKT 4 is received after PKT 2 without receiving, or before receiving, PKT 3). In the example, the receiving device has been configured without a packet discard indication indicative of packets of flow 505 being designated for packet discarding (e.g., the receiving device has not received a packet discard indication indicative of a flow identifier, a PDU identifier, or a QCI identifier corresponding to flow 505 being designated for packet discarding). The receiving device triggers, after a wait timer expires, packet recovery procedures and requests, via an uplink control channel resource, for example, that missing PKT 3 be retransmitted.

In contrast, for flow 510, the receiving device receives an out-of-sequence PKT 10 after receiving PKT 6, but a discard indication has configured the receiving communication device to receive flow 510 with an 'assumption' that packets of flow 510 are to be transmitted with packet discarding being implemented, for example as a default or automatically. Thus, the receiving device treats received packets in effect as if the received packets were transmitted according to a best effort protocol and proceeds with receiving packets of flow 510 without triggering packet recovery mechanisms, such as, for example, without requesting retransmission of missing packets PKT 7, PKT 8, or PKT 9, via a NACK.

Figure 6A:
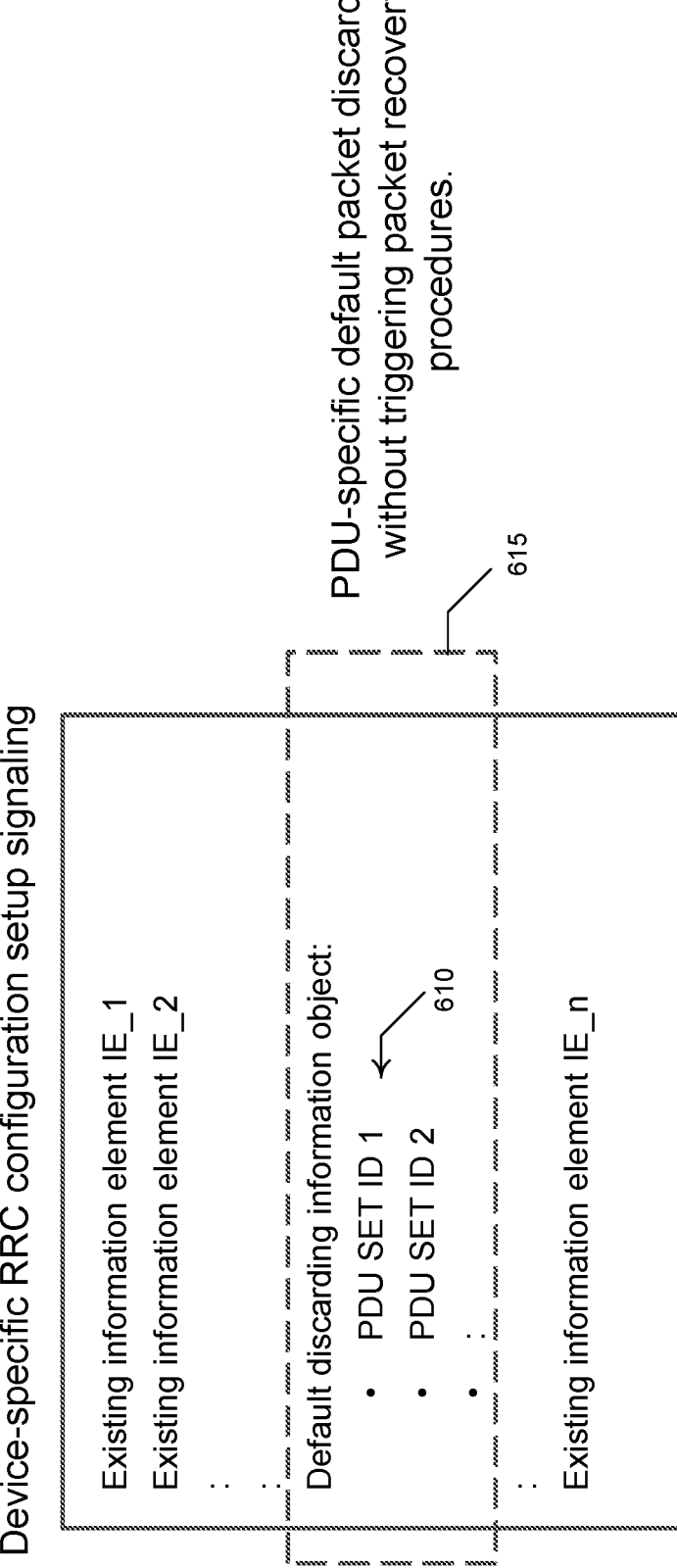
FIG. 6A illustrates an example downlink control information message comprising an automatic packet discard indication indicative of specific flows to which automatic packet discarding may be applied.

In an example embodiment shown in FIG. 6A, a RAN node may configure user equipment devices via a downlink control indication message ("DCI") 605 with identifiers 610 corresponding to specific flows, or PDU sets. Transmitting and receiving of the packet discard indication may be part of establishing the communication session, for example, via RRC signaling messages, or the transmitting and receiving of the packet discard indication may be separate from establishing the communication session. One or more identifiers may make up an automatic packet discard indication 615. A packet discard indication 615 may comprise a PDU set identifier, a traffic flow identifier, or a DRB identifier associated with intentional packet discarding by a RAN that will be transmitting flows identified by identifier(s) 610. A PDU set identifier, a traffic flow identifier, or a DRB identifier may be associated in indication 615 with packet discarding as a default protocol because of correspondence to flows that are typically latency stringent but that may have a relaxed reliability requirement, which may be referred to simply as a relaxed reliability. In other words, for a given flow, latency may be important but an occasional packet missing from the flow is acceptable at a communication device receiving the flow. Therefore, packet discard indication 615 facilitates discarding, by a transmitting device, such as a network node, of a packet violating a stringent latency budget corresponding to a traffic flows designated for packet discarding without a user equipment that is receiving the traffic flow triggering packet recovery procedures, (e.g., a UE is made aware via indication 615 of discarding by a RAN node of packets of a flow having stringent latency requirement and thus does not transmit NACK messages to request retransmission from the RAN to the UE of packets missing from the flow). As a result of using indication 615 for a RAN to indicate to a UE one or more flows corresponding to identifiers 610 for which packet discarding may be implemented by the RAN, user equipment devices may avoid transmitting negative ACK indications for packets having missing sequence numbers after receiving an out-of-sequence packet of a flow identified by an identifier 610. Accordingly, network and device power saving is achieved while reducing usage of control channel overhead. PDU set identifiers 610, or other identifiers corresponding to flows, may be exchanged via message 605 during radio resource control connection establishment signaling when a UE request certain traffic flows from a RAN.

In another embodiment, a radio resource control message 650 may comprise a packet discard indication 655 that may indicate to a communication device of one or more flow identifiers, or PDU sets, 660 to which certain resources are granted. Indication 655 may be used by a receiving communication device to determine whether traffic of a flow is associated with automatic packet discarding. As shown in FIG. 6B, a format of the downlink control information 650 may comprise conventional DCI information elements such as granted resources and respective transmission configuration. However, DCI 650 may comprise new identifier information 660, for example, an indication that traffic of one or more PDU set(s), flow(s), or QCI(s) are designated for packet discarding if transmitted via a specified granted resource 664. Thus, a receiving communication device may be configured to determine that out-of-sequence packets received via a configured resource 664 may be indicative of a traffic flow that comprises the out-of-sequence packets being subject to packet discarding by a transmitting communication that transmitted the out-of-sequence packets. Thus, a resource 664 indicated by indication 655 of a DCI 650 may indicate that regardless of traffic flows transmitted over granted resources indicated in the same DCI, packet discarding is enabled for flows received via a resource 664. Using an indication 655 of packet discarding to cause a receiving communication device, such as a user equipment, to refrain from transmitting a NACK in response to missing packets may result in less signaling overhead being used due to only adding a small indication, for example a single bit in DCI 650, to indicate packet discarding corresponding to a resource instead of indicating a full flow, or PDU set identifier, information as described in reference to FIG. 6A.

Figure 6C:
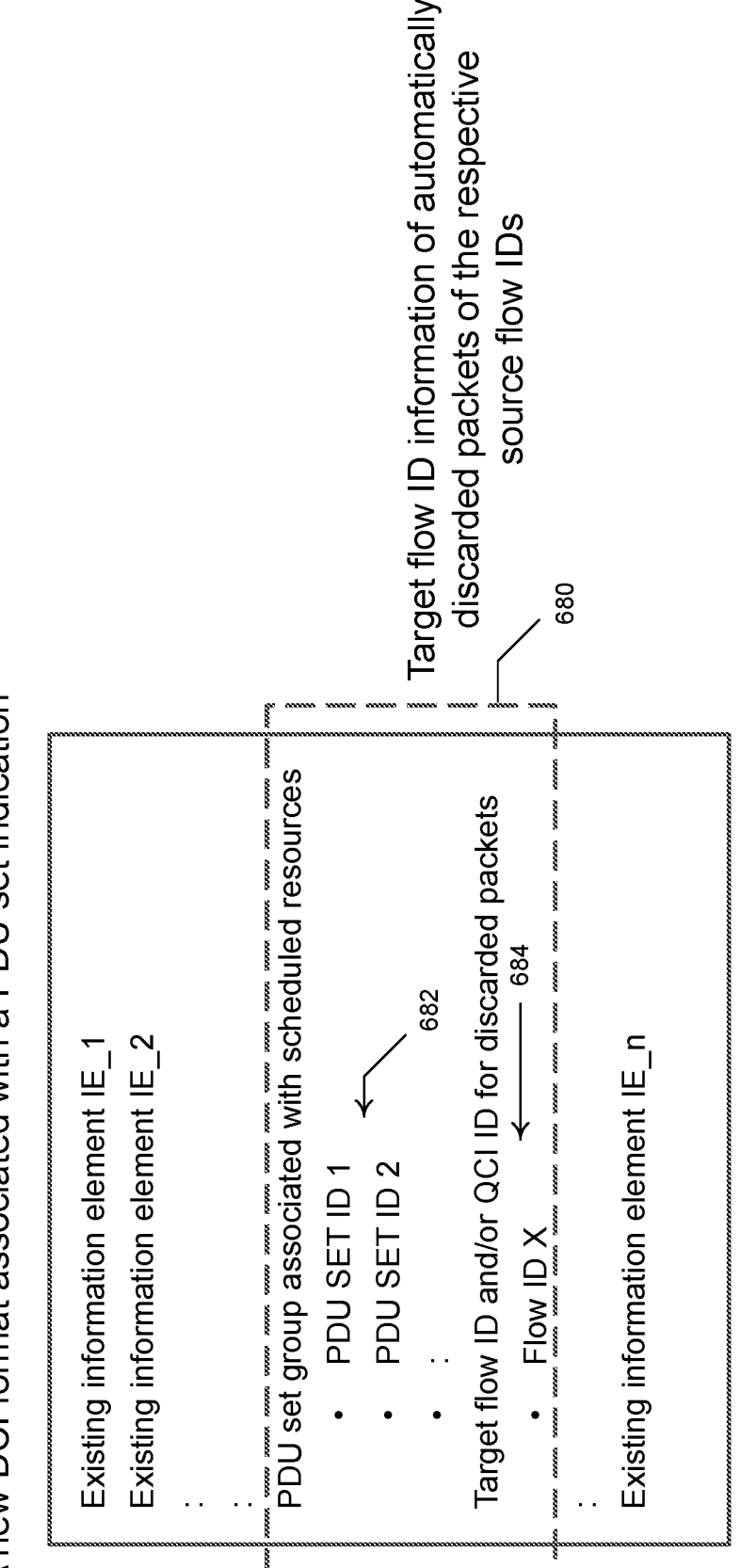
FIG. 6C illustrates an example downlink control information message comprising an automatic packet discard indication indicative of specific flows to which automatic packet discarding is to be applied and indicative of specific flows via which transmission of discarded packets may be attempted.

In an embodiment, dynamic flow switching of discarded packets may be implemented. As discussed elsewhere herein, a user equipment configured for intentional discarding of packets of a flow may not 'expect' to receive discarded packets via traffic flow because a RAN may discard packets that have violated a corresponding latency budget due to network congestion so as not to cause additional buffering delay. Such violation of a latency budget may indicate network resource congestion or starvation, and accordingly, packets may be discarded from a configured highly reliable and low latency flow. However, instead of discarding and not transmitting a packet that has been in a scheduling buffer in violation of a latency criterion, in an embodiment, a RAN may 'offload' packets discarded from one traffic flow and transmit the offloaded packets via a resource set allocated to a different traffic flow that may be configured for a less stringent reliability and thus the different flow may have free, or available, resources whereas the flow from which the packets were discarded does not (e.g., because the different flow is configured for lower priority or lower reliability traffic, scheduled packets require less resources, thus resources allocated for the different flow may be underutilized). Packet offloading may be useful to transmit packets discarded from a first traffic flow having a stringent latency budget but a relaxed reliability requirement such that some amount of packet loss can be tolerated if packets of the flow that are actually received are received according to the stringent latency budget. Accordingly, a RAN node can dynamically switch, or offload, transmission of discarded packets, or to-be-discarded packets, to other active but less reliable traffic flows to facilitate possible packet transmission instead of discarding. A discarded packet that has been offloaded to a resource set that is allocated to a less reliable flow may still not be received at a receiving device, but at least an attempt may be made to achieve transmission while not impinging on the latency budget of the original flow. As depicted by FIG. 6C, DCI format 675 may comprise a packet discard identifier 680 that comprises a target flow identifier 684 corresponding to a flow to potentially be used to transmit future discarded packets of a flow indicated as being enabled for discarding by discarding-enabled flow identifiers 682. Thus, from the perspective of a receiving user equipment, when one or more packets are missing from a flow transmission corresponding to a flow indicated by discarding-enabled flow identifiers 682 the receiving user equipment may attempt to receive packets discarded from a discarding-enabled flow 982 via a target flow 684. As an example, traffic flow 430 described in reference to FIG. 4 may be indicated as a discarding-enabled flow by indication 682 and flow 431 may indicated by an indication 684 as a target flow configured for receiving packets discarded from flow 430 and offloaded to flow 431.

Turning now to FIG. 7, the figure illustrates a timing diagram of an example method 700 to discard packets of a traffic flow without out-of-sequence packets triggering negative-acknowledgement messaging at a receiving device. At act 705, RAN 105 may transmit to UE 115, and at act 710 the UE may receive, protocol data unit ("PDU") set dynamic discarding information, as part of radio resource control ("RRC") configuration signaling procedures. (It will be appreciated that a PDU set may comprise multiple PDUs, for example, a traffic flow may comprise multiple packets.) For example, the discarding information may comprise PDU-set identifiers indicated as being associated with traffic flows that are configured for packet discarding (e.g., for a traffic flow indicated by an identifier associated with the traffic flow, in-sequence delivery may not be performed by RAN 105 for a PDU of the traffic flow corresponding to the PDU-set identifier that exceeds a criterion, such as, for example, a latency criterion). The discarding information may comprise, or may indicate, a downlink control information format to monitor and use for configuration of a PDU-set as being subject to data unit discarding by RAN 105. At act 715, UE/WTRU 115 may monitor and blindly decode a control channel resource configured by RAN 105 for the UE to use for control channel signaling and the UE may receive a DCI format indication indicative of a DCI format to be used in conjunction with a packet discard indication to determine how to treat a PDU set identified in the packet discard indication by a corresponding PDU set identifier. A packet discard indication may indicate a DCI format for UE 115 to use. A packet discard indication may comprise information to be used in conjunction with an indicated DCI format to identify a PDU set (e.g., a flow) to which packet discarding is to be enabled by RAN 105. At act 720, UE/WTRU 115 may determine from a packet discard indication a DCI format, for example, DCI format 605, 650, or 675, described in reference to FIG. 6A, FIG. 6B, or FIG. 6C, respectively, and corresponding PDU-set identifiers for which resources are granted and for which packet discarding is enabled.

Continuing with description of FIG. 7, if UE 115 receives an out-of-sequence packet corresponding to a flow identified, in a packet discard indication, or based on information received in a packet discard indication, as being enabled for packet discarding by RAN 105, at act 725 UE/WTRU 115 may update a sequence number corresponding to a most recently received packet to be in-sequence with respect to a second most recently received packet of the flow. In an embodiment, updating of a sequence number may comprise renumbering a sequence number of a most recently received packet to be in-sequence with a second most recently received pact. In an embodiment, updating of a sequence number may comprise simply disregarding a sequence number of a missing packet even if the missing packet is missing from a traffic flow for which UE 115 is not configured to treat as a best effort traffic flow. Accordingly, by renumbering, or otherwise updating, sequence numbers of packets received out-of-sequence (e.g., a sequence number of a most recently received packet skips one or more sequence numbers relative to a second most recently received sequence number), initiating of a packet discard wait timer or initiating transmission of a negative acknowledgement message is not triggered by UE 115, and the UE continues to receive packets of the indicated traffic flow without expecting to receive packets corresponding to the missed sequence number(s). It will be appreciated that a sequence number of a given packet may be based on a sequence number of an immediately preceding, in-sequence packet and a size in bytes of the immediately preceding in-sequence packet. Therefore, it will be appreciated that incremental numbering of packets depicted in various figures described herein is used for purposes of illustration and is not meant to necessarily represent examples of actual packet sequence numbers, or PDU sequence numbers.

In an embodiment, UE 115 may receive and decode one or more IP packets belonging to a PDU set and extract and decode medium access control ("MAC") control element ("CE") appended to packets and may determining PDU set-specific discarding information. On condition of detecting a MAC CE corresponding to PDU-set discarding indicated at act 710, at act 725 UE/WTRU 115 may update a sequence number corresponding to a most recently received packet of the latest received packet sequence number to be in sequence with respect to a second most recently received packet of the flow as described above.

FIG. 8 illustrates a timing diagram of an example method 800 to offload discarded packets to an alternative traffic flow. At act 805, RAN node 105 may transmit to UE 115 a packet discard indication comprising PDU set dynamic discarding information. At act 810, UE 115 may receive the automatic packet discard indication transmitted at act 805. The automatic packet discard indication may be transmitted as part of a radio resource control configuration signaling message, and may comprise information, or may comprise information indicative of, information described in reference to DCI format 605, 650, or 675, illustrated in FIG. 6A, FIG. 6B, or FIG. 6C, respectively. Information indicated by a packet discard indication in conjunction with an indicated DCI format may indicate automatic discarding to be used for a PDU set (e.g., a flow of PDUs) identified by a PDU set identifier indicated by the packet discard indication. In an embodiment, a packet discard indication may be indicative of flow discarding for an identified and indicated flow. In an embodiment, a packet discard indication may be indicative of flow discarding for an identified and indicated flow that is received via an identified resource. In such embodiment, a packet discarding indication may be indicative that packet discarding is enabled for a given traffic flow if packets thereof are received via a resource, but that packet discarding is not enabled for the given traffic flow if packets thereof are received via a different resource. In an embodiment, a packet discard indication may be indicative of flow discarding for an identified and indicated flow, with an indication of a target flow to which discarded packets are to be offloaded to increase a likelihood that a packet discarded from one flow may nevertheless be delivered via another flow (e.g., flow switching). At act 815, on condition of receiving an out of sequence packet associated with one or more configured PDU set identifiers indicated as being enabled for packet discarding. UE/WTRU 115 may determine PDU a DCI format, based on configured PDU discarding format indication contained in the automatic packet discard indication. At act 820, on condition of determining that discarding has been enabled for the flow corresponding to the received out-of-sequence packet, UE/WTRU 115 may update a sequence number of a most recently received packet to be in sequence with a sequence number of a second most recently packet of the same flow. At act 825, on condition of determining that flow switching has been enabled (e.g., by an offload indication) for the flow corresponding to the received out-of-sequence packet, UE/WTRU 115 may determine one or more packets (or sequence numbers of the packets), which were likely discarded by RAN 105 based on UE 115 not receiving the packets in sequence with other packets. UE 115 may determine a target flow identifier (or an associated resource) corresponding to a flow to which RAN 105 may have offloaded transmission of the likely discarded packets. At act 830, on condition of determining discarded packets and a target flow, or a resource of the target flow, via which the discarded packers are to be transmitted, UE/WTRU 115 may update a receiving configuration corresponding to the discarded packets according to a quality-of-service corresponding to the target flow.

Figure 9:
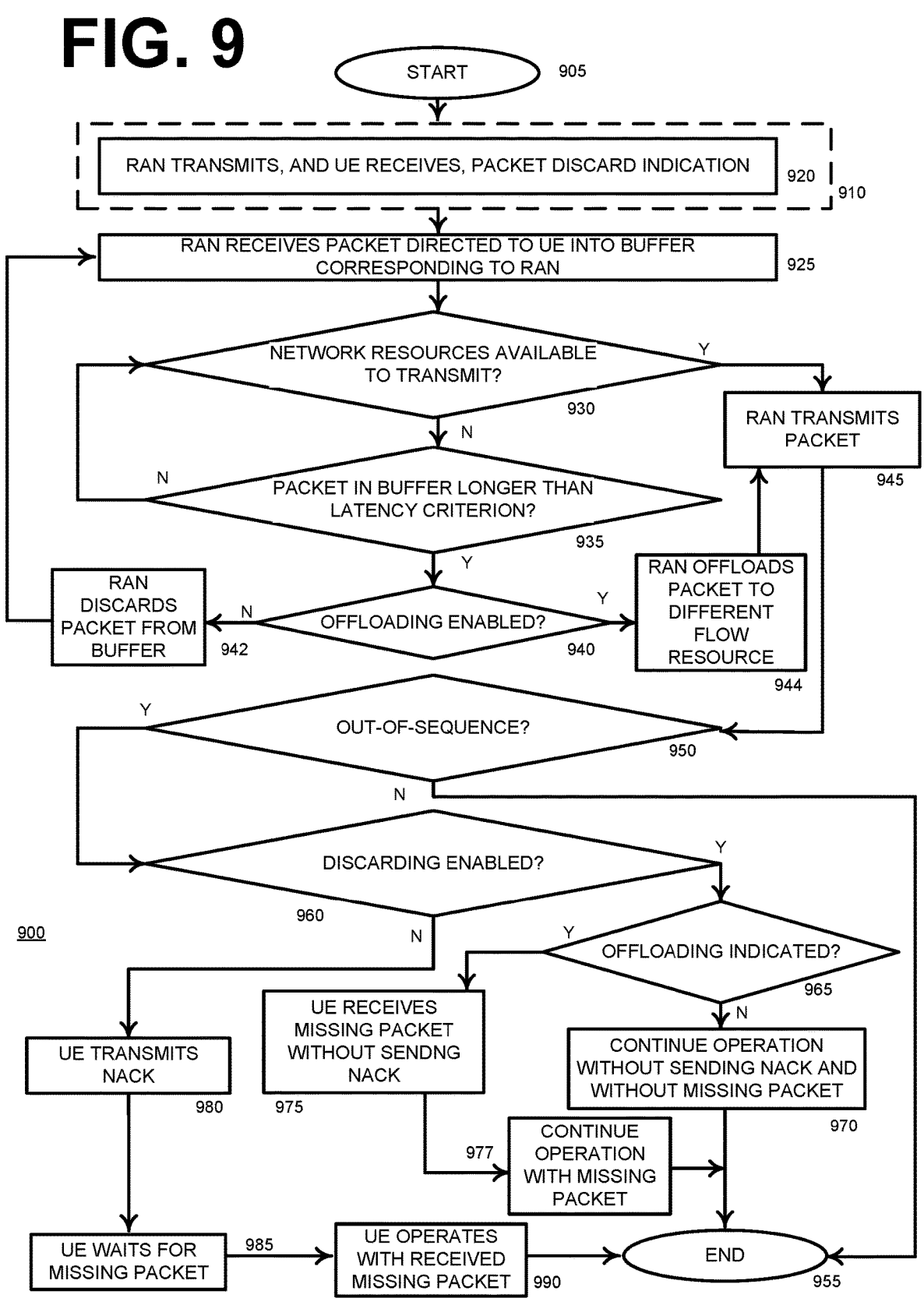
FIG. 9 illustrates a flow diagram of an example method to discard packets of a traffic flow without out-of-sequence packets triggering negative-acknowledgement messaging at a receiving device.

FIG. 9 illustrates a flow diagram of an example method 900 to discard packets of a traffic flow without out-ofsequence packets triggering negative-acknowledgement messaging at a receiving device. Method 900 begins at act 905. At act 910, radio access network node and a user equipment may establish a communication session. The communication session may be for the purposes of facilitating an application executing on the user equipment, for example, a virtual reality application facilitating use of a virtual reality appliance. At act 920, the radio access network node may transmit, and the user equipment may receive, a packet discard indication. Establishment of the communication session at act 910 is shown with dashed lines surrounding act 920 to show that the transmitting and receiving of the packet discard indication may be part of establishing the communication session, for example, via RRC signaling messages, or the transmitting and receiving of the packet discard indication may be separate from establishing the communication session. The communication session may comprise one or more protocol data unit sets, for example, one or more traffic flows comprising packets.

At act 925, the radio access network node may receive a packet corresponding to a flow, of the communication session, directed to the user equipment and may store, place, or otherwise retain the packet in a buffer corresponding to the radio access network node. The buffer may be a scheduling buffer. At act 930, the radio access network node may determine whether network conditions are available to transmit the packet stored in the buffer at act 925. Resources may not be available, for example, if congestion or radio interference impairs, or would likely impair, a channel, which may have been configured during session establishment at act 910, from transmitting the packet from the radio access network node to the user equipment. If a determination is made of act 930 that resources are not available to transmit the packet, method 900 advances to act 935. At act 935, the radio access network node may determine whether the packet has been in the buffer longer then a criterion, for example a latency criterion, which may be a configured value that may correspond to an application being executed by the user equipment. If a determination is made at act 935 that the packet has not been in the buffer longer than the latency criterion, method 900 returns to act 930.

Returning to description of act 930, if the radio access network node determines that there are resources available to transmit the packet received into the buffer at act 925, the radio access network node may transmit the packet to the user equipment at act 945.

Returning to description of act 935, if a determination is made that the packet received into the buffer at act 925 has been in the buffer longer than the latency criterion, method 900 advances to act 940. At act 940, the radio access network node may determine whether offloading was enabled via the packet discard indication transmitted to the user equipment at act 920. If offloading of packets of a flow to which the packet stored into the buffer at act 925 corresponds is not enabled, at act 942, the radio access network node discards the packet from the buffer, method 900 returns to act 925, and the radio access network node may continue to receive packets directed to the user equipment into the scheduling buffer.

Returning to description of act 940, if the radio access network node determines that offloading of packets of a flow of the communication session established it 910 to which the package stored into the buffer at act 925 corresponds is enabled, the radio access network node may offload the packet at act 944. Offloading of the packet stored into the buffer at act 925 may comprise removing the packet from the buffer and selecting a resource corresponding to a different traffic flow then a resource via which the packet may be configured to transmit the packet via the flow to which the packet corresponds. After offloading the packet that was stored into the buffer at act 925, the radio access network node may transmit the packet to the user equipment at act 945 using a different resource than if the radio access network node had transmitted the packet at act 945 after method 900 advanced to act 945 from act 930. In words, the radio access network node may use a resource corresponding to, and configured to be used for, a second traffic flow as indicated by the packet discard indication instead of using a resource corresponding to a first traffic flow, which may be the traffic flow to which the packet stored into the buffer at act 925 corresponds.

After the radio access network node transmits a packet at act 945, the user equipment to which the packet is directed may receive the packet and determine at act 950 whether the packet comprises a sequence number that is out of sequence with respect to a previously most recently received packet. If the user equipment determines at act 950 that the packet just received is not out of sequence, method 900 advances to act 955 and ends. The packet may not be out-of-sequence if the radio access network node determined at act 930 that resources were available to transmit the packet, the packet had not exceeded a latency criterion in the buffer, and radio access network node transmitted the packet at act 945 after a determination made at act 930 was that sufficient network resources were available to transmit the packet.

Returning to description of act 950, if a determination is made that the packet transmitted at act 945 is out of sequence, method 900 advances to act 960. At act 960, the user equipment may determine whether the packet discard indication received at act 920 indicates that packet discarding corresponding to the flow that comprises the packet that was transmitted at act 945 is enabled. If a determination is made that packet discarding is enabled for the traffic flow corresponding to the packet transmitted at act 945, method 900 advances to act 965. At act 965 the user equipment may determine whether offloading is indicated by the packet discard indication received act 920. If a determination is made that the packet discard indication does not indicate packet offloading is enabled, method 900 advances to act 970. At act 970, the user equipment may continue operation without sending a negative acknowledgement message to the radio access network node that one or more packets may be missing from the traffic flow to which the packet transmitted at act 945, and determined to be out of sequence at act 950, corresponds. Method 900 advances to act 955 and ends.

Returning to description of act 965, if a determination is made at act 965 that the packet discard indication received at act 920 indicates that offloading of packets is indicated as being enabled, method 900 advances to act 975 and receives the packet transmitted at act 945. At act 975, the user equipment may tune to a resource corresponding to a different traffic flow than the traffic flow to which the packet transmitted at act 945 corresponds. The different traffic flow may be a traffic flow of the communication session established at act 910 having a different quality of service, a different latency budget, a different reliability target, or a different other quality-related characteristic criterion. The user equipment may receive at act 975 the packet offloaded at act 944 and transmitted at act 945 according to the quality characteristic, or characteristics, corresponding to the different traffic flow.

Accordingly, using offloading indicated by a packet discard indication received at act 920, the user equipment may receive a packet stored into the buffer at act 925 that may have otherwise been discarded and not transmitted by the radio access network node due to channel congestion, for example. However, the transmission of the offloaded packet via a resource corresponding to a different traffic flow than a traffic corresponding to the packet may have a lower reliability than the packet's original flow. Nevertheless, using offloading at least provides a possibility that the packet may be delivered instead of being discarded and not transmitted by the radio access network node. After receiving the packet transmitted at act 945 via offloading, method 900 advances to act 977 and the user equipment continues operation with the missing packet without having transmitted a NACK to the radio access network node. Method advances from act 977 to act 95 and ends.

Returning to description of act 960, if the user equipment determines that discarding of the packet determined to be an out of sequence packet at act 950 is not enabled, method 900 advances to act 980. At act 980, the user equipment transmits a negative acknowledgement to the radio access network node and waits at act 985 to receive the packet in response to the negative acknowledgement. It will be appreciated that the waiting by user equipment to receive a missing packet at act 985 is not the waiting that may correspond to a wait timer used by the user equipment to determine whether a missing packet corresponding to an out of sequence has been received before sending a negative acknowledgement corresponding to having received the out-of-sequence packet. At act 990, the user equipment receives the missing packet corresponding to the packet that was determined to be out of sequence at act 950, and continues operation with the missing packet. Method 900 advances from act 990 to act 955 and ends.

It will be appreciated that if the user equipment determines at act 960 that discarding of packets corresponding to a flow to which the packet that was determined at act 950 to be out of sequence corresponds, such determination may be made based on the packet discard indication received at 920 not indicating the traffic flow corresponding to the packet that was determined to be out of sequence at act 950 as being enabled for discarding. It will also be appreciated that the packet discard indication received at act 920, used by the user equipment to make the determination at act 960 that discarding is not enabled, may indicate that a flow corresponding to the packet determined to be out of sequence at act 950 may be enabled for discarding if the user equipment receives the packet according to a first resource, but if the packet is received by the user equipment according to a second resource, or different resource, then discarding is not enabled for the flow corresponding to the packet.

As can be seen in FIG. 9, if a user equipment determines at act 960 that discarding of a packet is not enabled for a flow corresponding to a packet determined at act 950 to be out of sequence, the user equipment transmits a negative acknowledgement at act 980, waits for the missing packet at act 985, and then receives and operates with the missing packet at act 990.

In contrast, if discarding of packets of a flow corresponding to a packet determined at act 950 to be out of sequence is enabled, the user equipment does not transmit a negative acknowledgement and either operates without a missing packet at act 970 or receives the missing packet via an offloading resource and operates with the missing packet at act 977. Accordingly, based on information contained in a packet discard indication received at act 920, a user equipment may be configured to recognize that a packet determined to be out-of-sequence at act 950 corresponds to a flow for which the radio access network node may discard a packet from a scheduling buffer if the packet exceeds a latency criterion at act 935 without additional messaging or delay at the user equipment after a determination is made that a packet is an out-of-sequence packet.

Turning now to FIG. 10, the figure illustrates an example embodiment method 1000 comprising at block 1005, establishing, by a radio access network node comprising a processor with a user equipment, a communication session comprising a first traffic flow associated with a quality-of-service; at block 1010 transmitting, by the radio access network node to the user equipment, a packet discard indication corresponding to the first traffic flow, wherein the packet discard indication is indicative to the user equipment that an out-of-sequence packet of the first traffic flow is to be indicative of discarding, by the radio access network node, of a packet of the first traffic flow; at block 1015 receiving, by the radio access network node into a buffer, at least one packet to be transmitted to the user equipment via the first traffic flow; at block 1020 determining, by the radio access network node, a buffer time of the at least one packet being in the buffer to result in a determined buffer time; at block 1025 analyzing, by the radio access network node, the determined buffer time with respect to a latency criterion corresponding to the first quality-of-service to result in an analyzed determined buffer time; and at block 1030 based on the analyzed determined buffer time being determined to satisfy the latency criterion, discarding, by the radio access network node, the at least one packet.

Turning now to FIG. 11, the figure illustrates an example first communication device 1100, comprising at block 1105 a processor configured to establish, with a second communication device, a communication session comprising at least a first traffic flow; at block 1110 receive, into a buffer corresponding to the first communication device, at least one packet of the first traffic flow, to be transmitted to the second communication device corresponding to the first traffic flow; at block 1115 determine a buffer time of the at least one packet of the first traffic flow being in the buffer to result in a determined buffer time; at block 1120 analyze the determined buffer time with respect to a first latency criterion corresponding to the first traffic flow to result in an analyzed determined buffer time; at block 1125 based on the analyzed determined buffer time satisfying the first latency criterion, discard, according to a packet discard indication, the at least one packet of the first traffic flow; and at block 1130 wherein the establishing of the communication session comprises communicating the packet discard indication corresponding to the first traffic flow, wherein the packet discard indication is indicative that an out-of-sequence packet of the first traffic flow is indicative of a packet of the first traffic flow being discarded.

Turning now to FIG. 12, the figure illustrates a non-transitory machine-readable medium 1200 comprising at block 1205 executable instructions that, when executed by a processor of a radio access network node, facilitate performance of operations, comprising establishing, with a user equipment, a communication session comprising a first traffic flow associated with a first maximum latency; at block 1210 based on the first maximum latency, enabling packet discarding for the first traffic flow; at block 1215 transmitting a packet discard indication indicative to the user equipment that an out-of-sequence packet of the first traffic flow is to be indicative that the radio access network node has discarded at least one packet of the first traffic flow; at block

1220 receiving, into a buffer, a packet of the first traffic flow; at block 1225 determining a time of the packet being in the buffer to result in a determined buffer time; at block 1230 analyzing the determined buffer time with respect to the first maximum latency to result in an analyzed determined buffer time; and at block 1235 based on the analyzed determined buffer time exceeding the first maximum latency, discarding the packet to result in a discarded packet.

Turning now to FIG. 13, the figure illustrates an example embodiment method 1300 comprising at block 1305, establishing, by a user equipment comprising a processor with a radio access network node, a communication session comprising a first traffic flow, to facilitate execution of an application by the user equipment; at block 1310 receiving, by the user equipment from the radio access network node, a packet discard indication corresponding to the first traffic flow; at block 1315 receiving, by the user equipment, a first out-of-sequence packet corresponding to the first traffic flow; at block 1320 based on the packet discard indication, refraining, by the user equipment, from the transmitting, to the radio access network node, of a negative acknowledgement corresponding to the first out-of-sequence packet; at block 1325 executing, by the user equipment, the application using the first out-of-sequence packet; and at block 1330 wherein the packet discard indication comprises a first flow identifier corresponding to the first traffic flow, wherein the first flow identifier is indicative of enablement, by the radio access network node, of packet discarding to be applied to packets that make up the first traffic flow, and wherein the refraining by the user equipment from the transmitting to the radio access network node of a negative acknowledgement corresponding to the first out-of-sequence packet is based on the first out-of-sequence packet corresponding to the first flow identifier.

Turning now to FIG. 14, the figure illustrates an example first communication device 1400, comprising at block 1405 a processor configured to establish, with a second communication device, a communication session comprising at least a first traffic flow, wherein the establishing of the communication session comprises receiving a packet discard indication corresponding to the first traffic flow, wherein the packet discard indication comprises a first flow identifier corresponding to the first traffic flow, and wherein the packet discard indication is indicative that an out-of-sequence packet that comprises the first flow identifier is indicative of a packet of the first traffic flow having been discarded by the second communication device; at block 1410 receive, from the second communication device, a first packet comprising the first flow identifier; at block 1415 receive, from the second communication device, a second packet comprising the first flow identifier; at block 1420 determine that the second packet is out-of-sequence with respect to the first packet to result in a determined out-of-sequence packet; and at block 1425 based on the determined out-of-sequence packet being indicative of at least a third packet of the first traffic flow having been discarded by the second communication device, refrain from transmitting a negative acknowledgment corresponding to the third packet.

Turning now to FIG. 15, the figure illustrates a non-transitory machine-readable medium 1500 comprising at block 1505 executable instructions that, when executed by a processor of a user equipment, facilitate performance of operations, comprising receiving, by the user equipment from a radio access network node, a radio resource control message comprising a downlink control information format indication indicative of a downlink control information format, wherein the downlink control information format comprises a protocol data unit discard indication corresponding to a communication session between the user equipment and the radio access network node, wherein the communication session comprises at least a first protocol data unit set, and wherein the protocol data unit discard indication is indicative that an out-of-sequence data unit of the first protocol data unit set is to be indicative of a data unit of the first protocol data unit set being discarded by the radio access network node; at block 1510 receiving, by the user equipment from the radio access network node, an out-of-sequence data unit corresponding to the first protocol data unit set to result in a received out-of-sequence data unit; and at block 1515 based on the receiving of the received out-of-sequence data unit, according to the protocol data unit discard indication, determining, by the user equipment, to refrain from the transmitting, to the radio access network node, of a negative acknowledgement corresponding to the out-of-sequence data unit.

Figure 16:
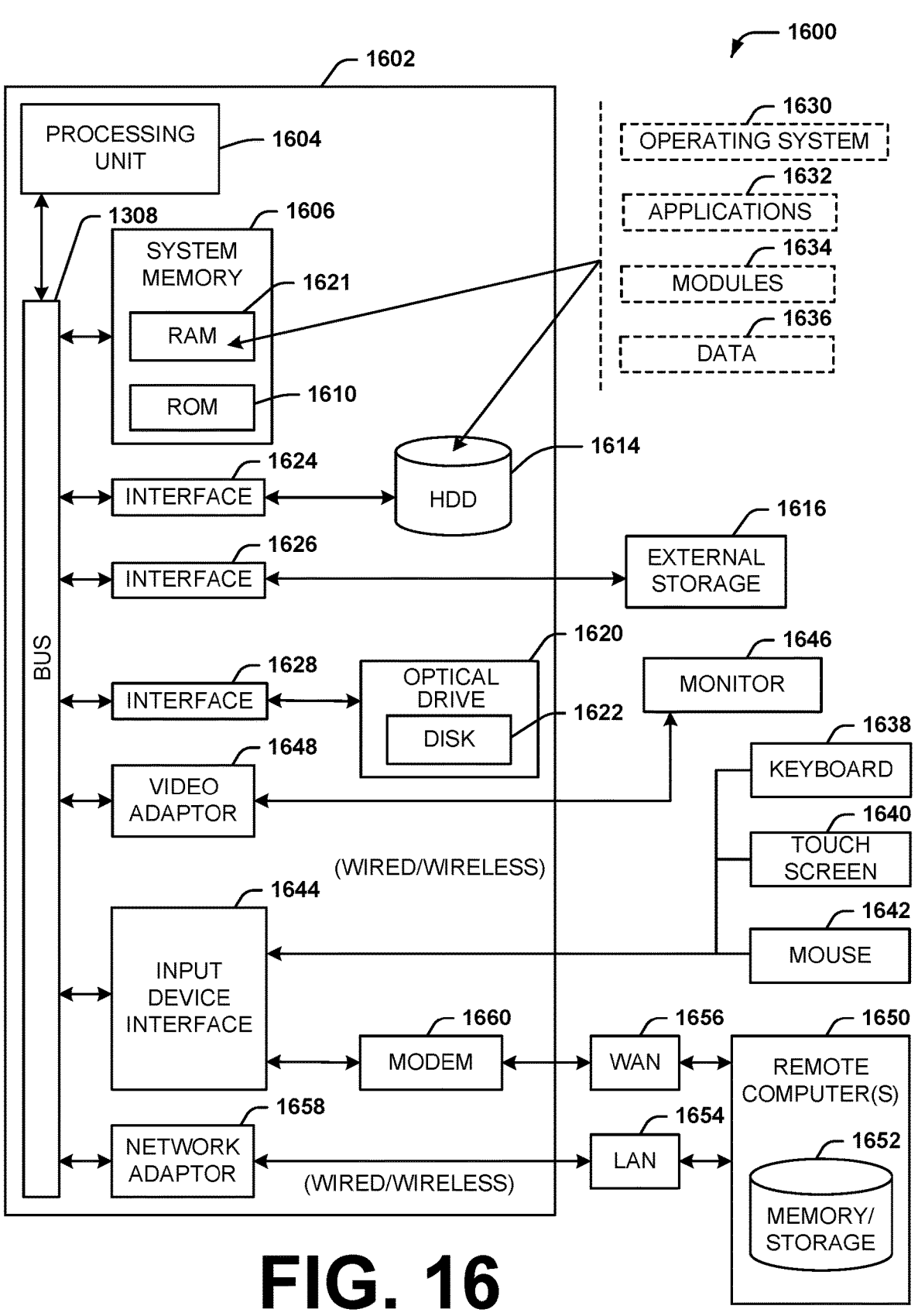
FIG. 16 illustrates an example computer environment.

In order to provide additional context for various embodiments described herein, FIG. 16 and the following discussion are intended to provide a brief, general description of a suitable computing environment 1600 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 16, the example environment 1300 for implementing various embodiments of the aspects described herein includes a computer 1302, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors and may include a cache memory. Dual micro-processors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM 1610 and RAM 1612. A basic input/output system (BIOS) can be stored in a non-volatile memory such as ROM, erasable programmable read only memory (EPROM), EEPROM, which BIOS contains the basic routines that help to transfer information between elements within the computer 1602, such as during startup. The RAM 1612 can also include a high-speed RAM such as static RAM for caching data.

Computer 1602 further includes an internal hard disk drive (HDD) 1614 (e.g., EIDE, SATA), one or more external storage devices 1616 (e.g., a magnetic floppy disk drive (FDD) 1616, a memory stick or flash drive reader, a memory card reader, etc.) and an optical disk drive 1620 (e.g., which can read or write from a CD-ROM disc, a DVD, a BD, etc.). While the internal HDD 1614 is illustrated as located within the computer 1602, the internal HDD 1614 can also be configured for external use in a suitable chassis (not shown). Additionally, while not shown in environment 1600, a solid-state drive (SSD) could be used in addition to, or in place of, an HDD 1614. The HDD 1614, external storage device(s) 1616 and optical disk drive 1620 can be connected to the system bus 1608 by an HDD interface 1624, an external storage interface 1626 and an optical drive interface 1628, respectively. The interface 1624 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems.

Computer 1602 can optionally comprise emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can comprise one virtual machine (VM) of multiple VMs hosted at computer 1602. Furthermore, operating system 1630 can provide runtime environments, such as the Java runtime environment or the .NET framework, for applications 1632. Runtime environments are consistent execution environments that allow applications 1632 to run on any operating system that includes the runtime environment. Similarly, operating system 1630 can support containers, and applications 1632 can be in the form of containers, which are lightweight, standalone, executable packages of software that include, e.g., code, runtime, system tools, system libraries and settings for an application.

Further, computer 1602 can comprise a security module, such as a trusted processing module (TPM). For instance, with a TPM, boot components hash next in time boot components, and wait for a match of results to secured values, before loading a next boot component. This process can take place at any layer in the code execution stack of computer 1602, e.g., applied at the application execution level or at the operating system (OS) kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1394 serial port, a game port, a USB port, an IR interface, a BLUETOOTH® interface, etc.

A monitor 1646 or other type of display device can be also connected to the system bus 1608 via an interface, such as a video adapter 1648. In addition to the monitor 1646, a computer typically includes other peripheral output devices (not shown), such as speakers, printers, etc.

The computer 1602 can operate in a networked environment using logical connections via wired and/or wireless communications to one or more remote computers, such as a remote computer(s) 1650. The remote computer(s) 1650 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1652 is illustrated. The logical connections depicted include wired/wireless connectivity to a local area network (LAN) 1654 and/or larger networks, e.g., a wide area network (WAN) 1656. Such LAN and WAN networking environments are commonplace in offices and companies, and facilitate enterprise-wide computer networks, such as intranets, all of which can connect to a global communications network, e.g., the internet.

When used in a LAN networking environment, the computer 1602 can be connected to the local network 1654 through a wired and/or wireless communication network interface or adapter 1658. The adapter 1658 can facilitate wired or wireless communication to the LAN 1654, which can also include a wireless access point (AP) disposed thereon for communicating with the adapter 1658 in a wireless mode.

When used in a WAN networking environment, the computer 1602 can include a modem 1660 or can be connected to a communications server on the WAN 1656 via other means for establishing communications over the WAN 1656, such as by way of the internet. The modem 1660, which can be internal or external and a wired or wireless device, can be connected to the system bus 1608 via the input device interface 1644. In a networked environment, program modules depicted relative to the computer 1602 or portions thereof, can be stored in the remote memory/storage device 1652. It will be appreciated that the network connections shown are example and other means of establishing a communications link between the computers can be used.

When used in either a LAN or WAN networking environment, the computer 1602 can access cloud storage systems or other network-based storage systems in addition to, or in place of, external storage devices 1616 as described above. Generally, a connection between the computer 1602 and a cloud storage system can be established over a LAN 1654 or WAN 1656 e.g., by the adapter 1658 or modem 1660, respectively. Upon connecting the computer 1602 to an associated cloud storage system, the external storage interface 1626 can, with the aid of the adapter 1658 and/or modem 1660, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 17:
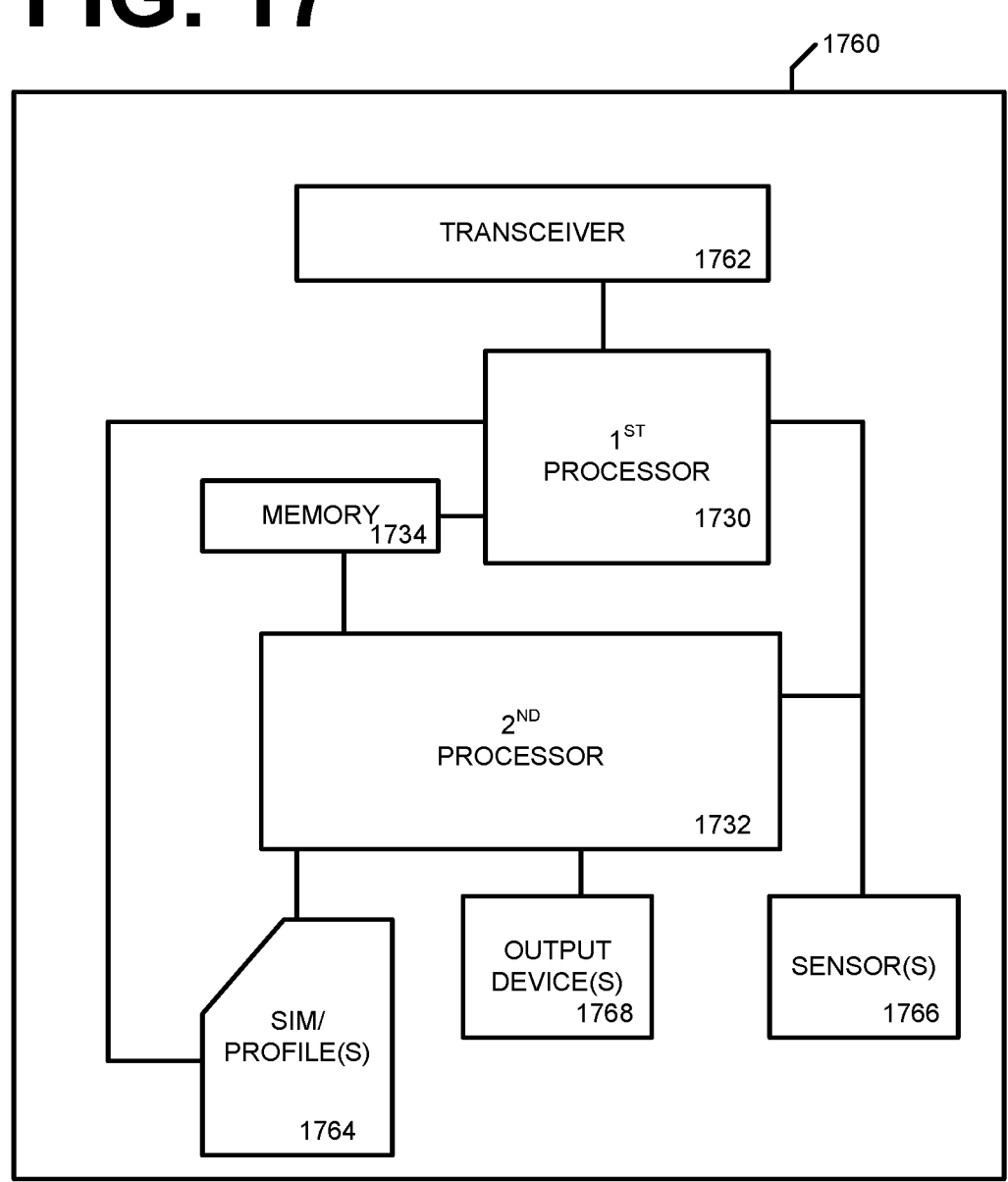
FIG. 17 illustrates a block diagram of an example wireless UE.

Turning to FIG. 17, the figure illustrates a block diagram of an example UE 1760. UE 1760 may comprise a smart phone, a wireless tablet, a laptop computer with wireless capability, a wearable device, a machine device that may facilitate vehicle telematics, a tracking device, remote sensing devices, and the like. UE 1760 comprises a first processor 1730, a second processor 1732, and a shared memory 1734. UE 1760 includes radio front end circuitry 1762, which may be referred to herein as a transceiver, but is understood to typically include transceiver circuitry, separate filters, and separate antennas for facilitating transmission and receiving of signals over a wireless link, such as one or more wireless links 125, 135, and 137 shown in FIG. 1. Furthermore, transceiver 1762 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 17, UE 1760 may also include a SIM 1764, or a SIM profile, which may comprise information stored in a memory (memory 34 or a separate memory portion), for facilitating wireless communication with RAN 105 or core network 130 shown in FIG. 1. FIG. 17 shows SIM 1764 as a single component in the shape of a conventional SIM card, but it will be appreciated that SIM 1764 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1764 and another device, which may be a component of RAN 105 or core network 130 shown in FIG. 1). A SIM profile 1764 may also comprise identifying information that is unique to the SIM, or SIM profile, such as, for example, an International Mobile Subscriber Identity ("IMSI") or information that may make up an IMSI.

SIM 1764 is shown coupled to both the first processor portion 1730 and the second processor portion 1732. Such an implementation may provide an advantage that first processor portion 30 may not need to request or receive information or data from SIM 1764 that second processor 1732 may request, thus eliminating the use of the first processor acting as a 'go-between' when the second processor uses information from the SIM in performing its functions and in executing applications. First processor 1730, which may be a modem processor or a baseband processor, is shown smaller than processor 1732, which may be a more sophisticated application processor, to visually indicate the relative levels of sophistication (i.e., processing capability and performance) and corresponding relative levels of operating power consumption levels between the two processor portions. Keeping the second processor portion 1732 asleep/inactive/in a low power state when UE 1760 does not need it for executing applications and processing data related to an application provides an advantage of reducing power consumption when the UE only needs to use the first processor portion 1730 while in listening mode for monitoring routine configured bearer management and mobility management/maintenance procedures, or for monitoring search spaces that the UE has been configured to monitor while the second processor portion remains inactive/asleep.

UE 1760 may also include sensors 1766, such as, for example, temperature sensors, accelerometers, gyroscopes, barometers, moisture sensors, and the like that may provide signals to the first processor 1730 or second processor 1732. Output devices 1768 may comprise, for example, one or more visual displays (e.g., computer monitors, VR appliances, and the like), acoustic transducers, such as speakers or microphones, vibration components, and the like. Output devices 1768 may comprise software that interfaces with output devices, for example, visual displays, speakers, microphones, touch sensation devices, smell or taste devices, and the like, that are external to UE 1760.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| PDU | Protocol Data Unit |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| PER | Packet error rate |
| PDB | Packet delay budget |
| E2E | End to end |
| NES | Network energy saving |
| RSRP | Reference signal received power |
| MIMO | Multi input multi output |
| UE | User equipment |
| WTRU | Wireless transmit receive unit |
| QCI | QoS Class Identifiers |
| BSR | Buffer status report |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

establishing, by a user equipment comprising at least one processor, with a radio access network node, a communication session comprising a first traffic flow, to facilitate execution of an application by the user equipment;

receiving, by the user equipment from the radio access network node, a packet discard indication corresponding to the first traffic flow;

receiving, by the user equipment, a first out-of-sequence packet corresponding to the first traffic flow;

based on the packet discard indication, refraining, by the user equipment, from the transmitting, to the radio access network node, of a negative acknowledgement corresponding to the first out-of-sequence packet; and executing, by the user equipment, the application using the first out-of-sequence packet.

2. The method of claim 1, wherein the communication session comprises a second traffic flow, the method further comprising:

receiving, by the user equipment, a second out-of-sequence packet corresponding to the second traffic flow;

transmitting, to the radio access network node, a negative acknowledgement corresponding to the second out-of-sequence packet;

receiving a missing packet corresponding to the second traffic flow based on the transmitting of the negative acknowledgment; and executing, by the user equipment, the application using the missing packet.

3. The method of claim 1, wherein the packet discard indication comprises a first flow identifier corresponding to the first traffic flow, wherein the first flow identifier is indicative of enablement, by the radio access network node, of packet discarding to be applied to packets that make up the first traffic flow, and wherein the refraining by the user equipment from the transmitting to the radio access network node of a negative acknowledgement corresponding to the first out-of-sequence packet is based on the first out-of-sequence packet corresponding to the first flow identifier.

4. The method of claim 3, further comprising determining, by the user equipment, a latency corresponding to the first traffic flow, wherein the application corresponds to an application type, and wherein the latency is determined based on the application type.

5. The method of claim 4, wherein a latency criterion corresponds to the first traffic flow, wherein the establishing of the communication session comprises transmitting a radio resource control message indicative of the latency criterion, and wherein the packet discarding is to be applied to one or more packets of the first traffic flow that are stored in a buffer of the radio access network node longer than the latency criterion.

6. The method of claim 1, wherein the packet discard indication comprises a first flow identifier corresponding to the first traffic flow, wherein the packet discard indication comprises a first resource associated with the first flow identifier, wherein the first flow identifier being associated with the first resource is indicative of enablement, by the radio access network node, of packet discarding to be applied to packets that make up the first traffic flow that are transmitted via the first resource, and wherein the refraining by the user equipment from the transmitting of a negative acknowledgement corresponding to the first out-of-sequence packet is based on correspondence of the first out-of-sequence packet to the first flow identifier and based on the first out-of-sequence packet being received via the first resource.

7. The method of claim 1, wherein the packet discard indication comprises a first flow identifier corresponding to the first traffic flow, wherein the packet discard indication comprises a first resource associated with the first flow identifier, wherein the communication session comprises a second traffic flow, wherein the packet discard indication comprises a second flow identifier corresponding to the second traffic flow, wherein the packet discard indication comprises a second resource associated with the second flow identifier, wherein the packet discard indication comprises a packet offload indication indicative that an out-of-sequence packet of the first traffic flow is to be transmitted by the radio access network node to the user equipment via the second resource, the method further comprising:

based on the packet offload indication, receiving, by the user equipment, a missing packet of the first traffic flow corresponding to the first out-of-sequence packet via the second resource; and executing, by the user equipment, the application using the missing packet.

8. The method of claim 7, wherein the first traffic flow is associated with a first priority, wherein the second traffic flow is associated with a second priority, and wherein the second priority is lower than the first priority.

9. The method of claim 8, wherein the first traffic flow corresponds to data directed to a center portion of a virtual reality appliance, and wherein the second traffic flow corresponds to data directed to a peripheral portion of the virtual reality appliance.

10. The method of claim 1, wherein the application is an anything reality application that manages a virtual reality appliance that is communicatively coupled with the user equipment.

11. The method of claim 1, wherein the establishing of the communication session comprises the receiving of the packet discard indication via a radio resource control message that comprises the packet discard indication and that associates the packet discard indication with a first traffic flow identifier corresponding to the first traffic flow.

12. The method of claim 1, wherein the establishing of the communication session comprises the receiving of the packet discard indication via a radio resource control message that comprises the packet discard indication and that associates the packet discard indication with a protocol data unit set identifier corresponding to the first traffic flow.

13. The method of claim 1, wherein the establishing of the communication session comprises the receiving of the packet discard indication via a radio resource control message that comprises the packet discard indication, and wherein the packet discard indication indicates association of the packet discard indication with a quality-of-class identifier corresponding to the first traffic flow.

14. A first communication device, comprising:

at least one processor configured to:

establish, with a second communication device, a communication session comprising at least a first traffic flow, wherein the establishing of the communication session comprises receiving a packet discard indication corresponding to the first traffic flow, wherein the packet discard indication comprises a first flow identifier corresponding to the first traffic flow, and wherein the packet discard indication is indicative that an outof-sequence packet that comprises the first flow iden-
tifier is indicative of a packet of the first traffic flow
having been discarded by the second communication
device;

receive, from the second communication device, a first
packet comprising the first flow identifier;

receive, from the second communication device, a second
packet comprising the first flow identifier;

determine that the second packet is out-of-sequence with
respect to the first packet to result in a determined
out-of-sequence packet; and based on the determined out-of-sequence packet being
indicative of at least a third packet of the first traffic
flow having been discarded by the second communi-
cation device, refrain from transmitting a negative
acknowledgment corresponding to the third packet.

15. The first communication device of claim 14, wherein
the communication session comprises a second traffic flow,
wherein the packet discard indication comprises a first
resource indication indicative of a first resource to be used
to transmit the first traffic flow and a second resource
indication indicative of a second resource to be used to
transmit the second traffic flow, and wherein the packet
discard indication comprises an offload indication of a
discarded packet of the first traffic flow being transmitted by
the second communication device via the second resource,
wherein the processor is further configured to:

based on the offload indication, receive the third packet
via the second resource.

16. The first communication device of claim 15, wherein
the first traffic flow corresponds to a first reliability, wherein
the second traffic flow corresponds to a second reliability,
and wherein the second reliability is lower than the first
reliability.

17. A non-transitory machine-readable medium, compris-
ing executable instructions that, when executed by at least
one processor of a user equipment, facilitate performance of
operations, comprising:

receiving, by the user equipment, from a radio access
network node, a radio resource control message com-
prising a downlink control information format indica-
tion indicative of a downlink control information for-
mat, wherein the downlink control information format
comprises a protocol data unit discard indication cor-
responding to a communication session between the
user equipment and the radio access network node,
wherein the communication session comprises at least
a first protocol data unit set, and wherein the protocol
data unit discard indication is indicative that an out-
of-sequence data unit of the first protocol data unit set
is to be indicative of a data unit of the first protocol data
unit set being discarded by the radio access network
node;

receiving, by the user equipment from the radio access
network node, an out-of-sequence data unit corre-
sponding to the first protocol data unit set to result in a
received out-of-sequence data unit; and based on the receiving of the received out-of-sequence
data unit, according to the protocol data unit discard
indication, determining, by the user equipment, to
refrain from the transmitting, to the radio access net-
work node, of a negative acknowledgement corre-
sponding to the out-of-sequence data unit.

18. The non-transitory machine-readable medium of
claim 17, wherein the protocol data unit discard indication
comprises a first protocol data unit set identifier correspond-
ing to the first protocol data unit set, wherein the received
out-of-sequence data unit comprises the first protocol data
unit set identifier, and wherein the determining, by the user
equipment to refrain from the transmitting, to the radio
access network node, of a negative acknowledgement cor-
responding to the out-of-sequence data unit is based on the
received out-of-sequence data unit comprising the first pro-
tocol data unit set identifier.

19. The non-transitory machine-readable medium of
claim 17, wherein the downlink control information format
is indicative of a resource to be used by the radio access
network node for transmission of the first protocol data unit
set to the user equipment, wherein the protocol data unit
discard indication comprises a first protocol data unit set
identifier corresponding to the first protocol data unit set,
wherein the protocol data unit discard indication is indica-
tive that an out-of-sequence data unit, comprising the first
protocol data unit set identifier, received via the resource is
to be indicative of a data unit of the first protocol data unit
set having been discarded by the radio access network node,
and wherein the received out-of-sequence data unit com-
prises the first protocol data unit set identifier and is received
via the resource.

20. The non-transitory machine-readable medium of
claim 17, wherein the communication session comprises a
second protocol data unit set, wherein the downlink control
information format is indicative of a first resource to be used
by the radio access network node for transmission of the first
protocol data unit set to the user equipment, wherein the
downlink control information format is indicative of a
second resource to be used by the radio access network node
for transmission of the second protocol data unit set to the
user equipment, wherein the protocol data unit discard
indication comprises a first protocol data unit set identifier
corresponding to the first protocol data unit set, wherein the
protocol data unit discard indication comprises a second
protocol data unit set identifier corresponding to the second
protocol data unit set, wherein the protocol data unit discard
indication comprises an offload indication indicative that a
data unit of the first protocol data unit set to be discarded by
the radio access network node is to be offloaded from the
first protocol data unit set for transmission by the radio
access network node to the user equipment via the second
resource, and wherein the protocol data unit discard indica-
tion is indicative that an out-of-sequence data unit, com-
prising the first protocol data unit set identifier being
received via the first resource is to be indicative of a data unit
of the first protocol data unit set having been discarded by
the radio access network node being a discarded data unit,
wherein the received out-of-sequence data unit comprises
the first protocol data unit set identifier and is received via
the first resource, and wherein the operations further comprise:

based on the received out-of-sequence data unit compris-
ing the first protocol data unit set identifier and being
received via the first resource, receiving, via the second
resource, at least one discarded data unit of the first
protocol data unit set discarded by the radio access
network node.

* * * * *